United States Patent
Faxér et al.

(10) Patent No.: US 10,390,235 B2
(45) Date of Patent: Aug. 20, 2019

(54) GAP DESIGN USING DISCOVERY SIGNAL MEASUREMENTS

(71) Applicant: TELEFONAKTIEBOLAGET LM ERICSSON (PUBL), Stockholm (SE)

(72) Inventors: Sebastian Faxér, Järfälla (SE); Maksym Girnyk, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 232 days.

(21) Appl. No.: 15/212,638

(22) Filed: Jul. 18, 2016

(65) Prior Publication Data
US 2018/0020363 A1   Jan. 18, 2018

(51) Int. Cl.
| | |
|---|---|
| H04W 16/28 | (2009.01) |
| H04L 12/26 | (2006.01) |
| H04W 72/04 | (2009.01) |
| H04W 72/08 | (2009.01) |
| H04B 7/024 | (2017.01) |
| H04W 76/27 | (2018.01) |
| H04L 5/00 | (2006.01) |
| H04B 7/06 | (2006.01) |

(52) U.S. Cl.
CPC ............ *H04W 16/28* (2013.01); *H04B 7/024* (2013.01); *H04L 5/005* (2013.01); *H04L 5/0073* (2013.01); *H04L 43/16* (2013.01); *H04W 72/042* (2013.01); *H04W 72/0413* (2013.01); *H04W 72/082* (2013.01); *H04W 76/27* (2018.02); *H04B 7/0617* (2013.01)

(58) Field of Classification Search
CPC ...... H04W 16/28; H04W 76/27; H04B 7/024; H04L 43/16
See application file for complete search history.

(56) References Cited

U.S. PATENT DOCUMENTS

| | | |
|---|---|---|
| 2015/0078191 A1 | 3/2015 | Jöngren et al. |
| 2016/0218783 A1* | 7/2016 | Janis ................ H04B 7/0469 |
| 2017/0006613 A1* | 1/2017 | Kakishima ........... H04W 76/14 |
| 2017/0180016 A1* | 6/2017 | Park ................... H04B 7/024 |

FOREIGN PATENT DOCUMENTS

| | | |
|---|---|---|
| EP | 2988429 A1 | 2/2016 |
| WO | 2015063592 A1 | 5/2015 |
| WO | 2016048231 A1 | 3/2016 |

* cited by examiner

*Primary Examiner* — Derrick W Ferris
*Assistant Examiner* — Kevin H Lee

(57) ABSTRACT

A system and method of creating a "gap" in a network node's angular power profile to reduce the amount of inter-cell interference generated at certain critical directions. A plurality of network nodes may jointly derive the "gap" in the angular power profile of each of them. A transmitting node may rely on Discovery Reference Signal, DRS, based Reference Signal Received Power, RSRP, measurements of its beams from a neighboring node, which signals an interference metric for each beam indicating a relative beam interference level. The transmitting node utilizes the signaled metrics to determine which beams are causing undesirable interference and are to be removed from its set of candidate beams to create a "gap" in its angular power profile. The remaining candidate beams are used by the transmitting network node for subsequent directional data transmissions. Instead of this distributed approach, a central node-based beam removal approach may be implemented.

23 Claims, 7 Drawing Sheets

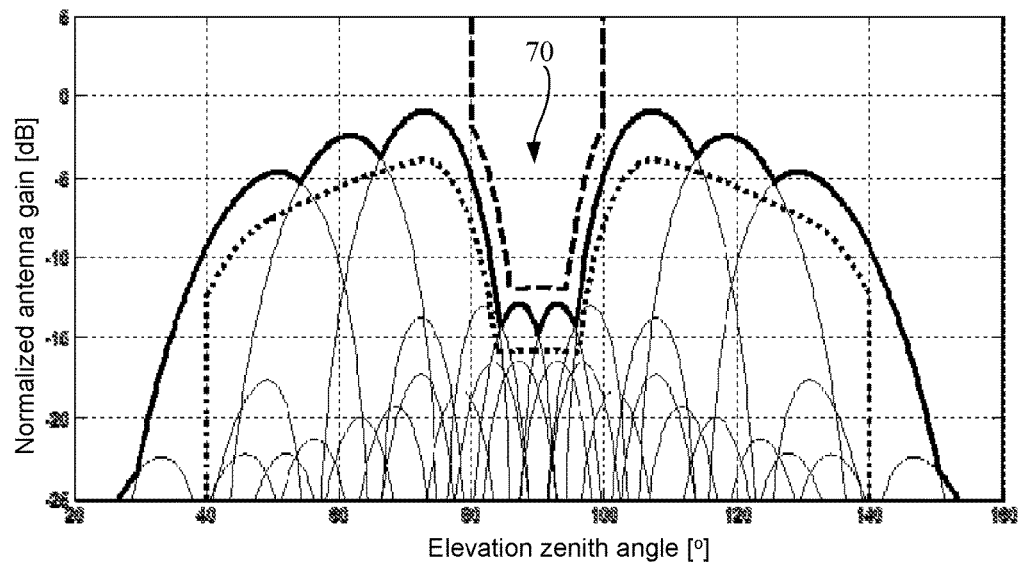
FIG. 4
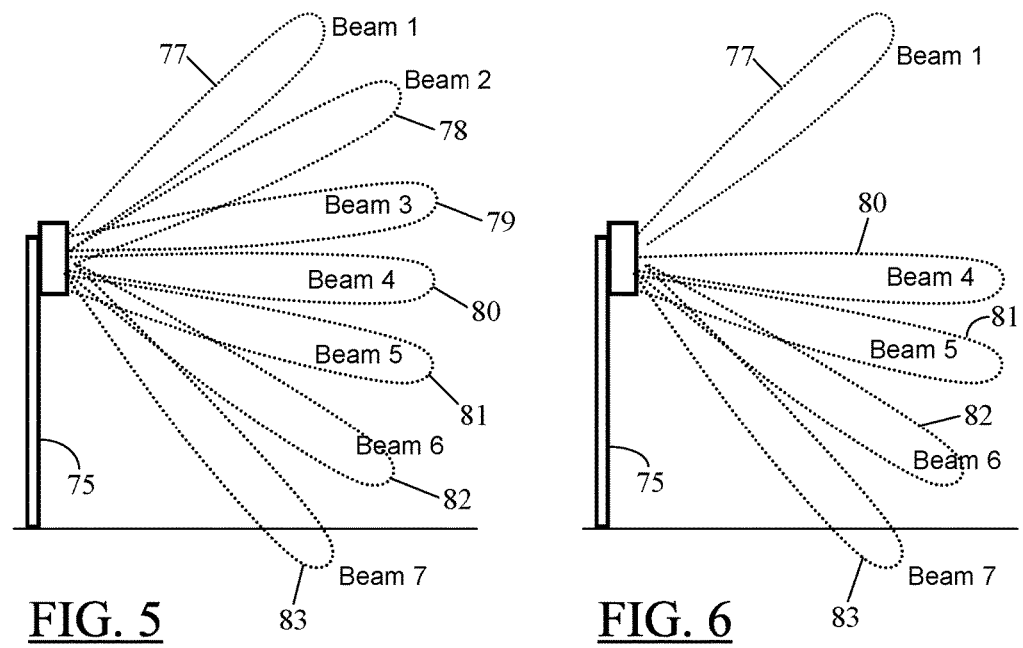
FIG. 5
FIG. 6

157 — A central node obtains a level of inter-cell interference caused in a neighboring cell by a transmitting network node's transmissions in each of a plurality of candidate beams. The transmitting network node utilizes beamforming for directional signal transmission to wireless devices operating within a served cell and it dynamically selects a beam from the plurality of candidate beams for transmitting data to one or more of the wireless devices. The central node is in operative communication with the transmitting network node.

159 — The central node identifies any beams that caused the level of inter-cell interference in the neighboring cell to exceed a high interference threshold.

161 — The central node performs one of the following based on the identification: (1) remove any identified beams from the plurality of candidate beams, or (2) instruct the transmitting network node to remove the identified beams. This creates a set of remaining candidate beams.

163 — The central node instructs the transmitting network node to transmit data to the wireless devices operating within the served cell utilizing only beams selected from the set of remaining candidate beams.

GAP DESIGN USING DISCOVERY SIGNAL MEASUREMENTS

TECHNICAL FIELD

The present disclosure relates to inter-cell interference management in a mobile communication system. More particularly, and not by way of limitation, particular embodiments of the present disclosure are directed to an apparatus and method of deriving a "gap" in the angular power profile of an evolved Node-B (eNodeB or eNB) that utilizes beamforming, wherein the gap is derived using the Discovery Reference Signal (DRS) based Reference Signal Received Power (RSRP) measurements of eNB's candidate beams to identify those beams that may cause an unacceptable level of interference in neighboring cells.

BACKGROUND

In a traditional cellular telecommunications system, the coverage of a cell is defined by the geographical area where Radio Frequency (RF) signals transmitted from a base station to a mobile wireless device, and vice versa, can be successfully received and decoded. For ease of discussion, a mobile wireless device may be interchangeably referred to as a User Equipment (UE). Also, the "RF signals" may be more simply referred to herein as "radio signals." The base station may be equipped with an antenna or a two-dimensional (2D) antenna array that transmits and receives radio signals according to an antenna beam pattern that typically spans a quite large angle in azimuth and/or elevation. The wider the angle is, the lower the antenna gain becomes. Hence, there is a tradeoff between angular coverage and coverage range for a given antenna pattern. In order to have a large angular coverage in combination with high antenna gain, a steerable antenna array can be used to form and steer beams in desirable directions.

In the coverage-related discussion herein, a "cell" and its associated base station such as, for example, an eNodeB, or a base station and its antenna array, may be referred to in an interchangeable manner and identified using the same reference numeral for ease of discussion. For example, a UE may be interchangeably referred to as receiving radio signals from a cell or an eNB, or the UE may be interchangeably referred to as receiving signals from a base station or the base station's antenna/antenna array.

Beamforming

The base stations in modern cellular systems may also employ beamforming (or beam steering). Beamforming or spatial filtering is a signal-processing technique used in antenna arrays for directional signal transmission and/or reception. It is understood that digital content may be transmitted using analog radio signals. In beamforming, the analog radio signals may be processed/shaped such that signals at particular angles experience constructive interference, while others experience destructive interference. Such analog beamforming can be used at both the transmitting and receiving ends to achieve spatial selectivity, such as, for example, rejection of unwanted signals from specific directions. The spatial selectivity may provide improved reception/transmission of signals in the system. Thus, beamforming can help improve wireless bandwidth utilization, and it can also increase a wireless network's range. This, in turn, can improve video streaming, voice quality, and other bandwidth- and latency-sensitive transmissions.

Beamforming can be achieved by controlling the phase and amplitude of different signals transmitted from and/or received from spatially separated antenna elements. This can be done, for example, using an antenna array with multiple ports or an active antenna with multiple sub-elements. Each sub-element may have a polarization direction, which potentially can be orthogonal to another sub-element's polarization.

For a beamforming system that only supports a set of fixed beams, all signals may be beamformed, although the desired direction of transmission may be unknown or only known to some extent. Furthermore, some beamforming systems, such as, for example, analog beamforming systems, can only transmit in one or a few beams simultaneously. In such systems, multiple beams may have to be scanned through in time domain to provide coverage to all the UEs attached to the base station.

Some form of information related to the radio channel between a transmitter, such as an eNB, and a receiver, such as a UE, is typically needed in order to perform efficient beamforming. Channel State Information (CSI) is given either in explicit or implicit form. Explicit CSI contains gain and phase difference between all pairs of transmit and receive antennas. On the other hand, implicit CSI is typically given by spatial precoder selections from the UE.

Beamforming is commonly performed so as to maximize the received power at a UE. Certain beamforming techniques have other objectives in addition to boosting the received signal power, for example, to remove or reduce the interference. Two examples of such objectives are the zero-forcing criterion, and the signal-to-leakage-plus-noise objective function.

Beamforming using implicit CSI is often more limiting in interference suppression capabilities since the complete channel is not known at the eNodeB. In this case, the straightforward beamformer (precoder) would be to use the one recommended by the UE, although eNB-based adjustments of the beamformer to reduce the interference is conceivable.

A special type of implicit CSI is beam selection feedback. In this case, the eNodeB transmits a plethora of spatially-distinct probing signals that are beamformed in specific directions. A UE is then instructed to select the most preferred beam, for example, in terms of received signal power, and report this to the eNodeB. An advantage of this type of feedback is that the number of antenna elements can be de-coupled from the CSI feedback; the UE need not estimate the full channel matrix. It is noted here that even if beam selection feedback may be appropriate for a dynamic beam selection system, other kinds of implicit or explicit CSI also can be used in a dynamic beam selection system. For example, a dynamic beamforming system may very well be based on implicit CSI reports, where, instead of the eNodeB transmitting a distinct set of beamformed reference signals, it transmits non-precoded reference signals from each antenna element.

Beamforming systems may have a calibration mismatch between the transmit (Tx) and receive (Rx) sides of an antenna array. On the other hand, some beamforming systems may even have separate 2D antenna arrays for transmission and reception, such that beamforming-related directional information regarding a beam received in the Uplink (UL) may not be applied to a beam transmitting in the Downlink (DL). These antenna arrays, however, may form part of a base station's antenna system. It is noted here that the terms "uplink" and "downlink" are used in their conventional sense: a transmission in the UL refers to a UE's transmission to a base station, whereas a transmission in the DL refers to a base station's transmission to a UE.

Elevation Beamforming

As previously stated, one way to perform beamforming is to use active antennas. An active antenna consists of a number of sub-elements that jointly form the antenna. The sub-elements can be virtualized. For example, pairs of physical sub-elements could be fed the same signal and, hence, share the same virtualized sub-element antenna port. Furthermore, in the case where an active antenna is mounted in such a way that the sub-elements are spread out on a vertical axis, a beamforming technique known as "elevation beamforming" may be possible. In the elevation beamforming, the transmitted and/or received signal may be directed in the elevation domain. This may be done by using different phases and amplitudes for the different sub-elements of the active antenna such that at certain angles—relative to the active antenna's vertical axis—the different signals experience constructive interference, whereas at other angles they experience destructive interference. In the discussion herein, the term "elevation beamforming" may be exclusively used as a dynamic beam-selection technique in the sense that an eNodeB using elevation beamforming may use different elevation beams to serve different UEs. Elevation beamforming may be a component of the more general case of joint elevation-azimuth beamforming from a two-dimensional antenna array.

It is noted here that the discussion herein primarily focuses on elevation beamforming as an example only. For the sake of brevity, all different types of beamforming techniques—such as, for example, azimuth beamforming, or joint azimuth and elevation beamforming using a 2D antenna array—are not discussed in appreciable detail.

FIG. 1 illustrates an example of a dynamic elevation beam selection. A base station or eNodeB 10 is shown to dynamically perform beam selection among three different elevation beams 12-14 (also identified as beams A-C, respectively). One UE 16 is shown—by way of an example—as being physically present and operating (or registered) within the cell (not shown) associated with the base station 10. For the sake of discussion herein, a UE, such as the UE 16, may be considered "attached to" or under the operative control of a base station or eNB, such as the base station 10. When a UE is attached to an eNB, a bi-directional communication session is established between the UE and the eNB for data transfer to/from the UE, thereby enabling the UE's user to carry out voice calls, data sessions, web browsing, and the like, using the cellular network of the eNB. In the case of a static beamformer, the eNodeB 10 would need to use one beam for all transmissions and, hence, would not be able to focus the transmitted power in the direction towards its UE of interest—here, the UE 16. On the other hand, in the directional transmissions using dynamic elevation beamforming, the eNB 10 can dynamically select the most appropriate elevation beam for the UE 16. For example, in the context of FIG. 1, the eNB 10 may select the elevation beam 13 (beam B) to transmit to the UE 16. The choice of beam B has the advantage that the transmitted energy will be directed in the same direction as the propagation path 18 between the eNodeB 10 and the UE 16. This leads to the UE 16 receiving a stronger signal from the eNB 10.

It is noted here that three selection beams 12-14 are shown in FIG. 1 just as an example. In a more general setting, there can be any number of selection beams. Furthermore, the used transmission beams can even be created dynamically, pointing in an arbitrary elevation direction and with an arbitrary shape (for example, beam width). Hence, an infinite number of elevation beams may be possible.

Cell Selection for an Elevation Beamforming System

In order for a UE to be served by an eNB, the UE first needs to connect (or attach) to the eNB in some way. This is typically done using some kind of control signaling such that a UE can compare different control signals, transmitted from different eNodeBs, and then attach to the eNodeB that corresponds to the strongest signal. The control signal may be typically beamformed and such a beamformed control signal may be referred to as a "cell selection beam" in the discussion herein.

FIG. 2 depicts cell selection beams 20-21 along with data transmission beams 23-26 and 28-31 in an elevation beamforming system. In FIG. 2, by way of an example, two eNodeBs 33-34 in the system are shown as performing elevation beamforming—using four elevation beams each 23-26 and 28-31, which are shown by dotted lines—when transmitting data. On the other hand, each eNB 33-34 provides one cell selection beam 20-21 (shown using solid lines), respectively. The different UEs in the system may then attach to the eNodeB that corresponds to the strongest cell selection beam. Thus, for example, the UEs 36-38 may attach to the eNB 33, whereas the UEs 40-42 may attach to the eNB 34. As before, the number of UEs, the number of eNBs, and the number of elevation beams in FIG. 2 are exemplary only.

Once a UE has attached to a certain eNodeB, it can have its data transmitted with one of the data transmission beams (or elevation beams) from the eNodeB. Three exemplary data transmission beams per eNB in FIG. 2 are shown by dotted lines. It is pointed out here that there may be many other signals also transmitted by an eNodeB. One such example is a cell selection beam—like the beam 20 or 21—that may also serve legacy UEs which are not able to utilize UE-specific elevation beamforming. In the same manner, there also may exist other data channels.

It is noted here that the term "cell" is used quite generally. In addition to referring to a typical cell in a cellular telecommunication network, it may also refer to a node, a point, a transmission point, a group of transmission points, and the like, in a wireless communication network.

Importance of Interference Avoidance

The above-described dynamic elevation beam selection is a powerful tool for directing the transmitted energy towards the UE of interest, thereby increasing the received signal level at the UE. However, interference is another aspect of this approach that needs to be taken into consideration to maximize the system performance. FIG. 3 is an exemplary illustration of how dynamic elevation beamforming may cause interference. In FIG. 3, two base stations (eNBs) 45-46 are shown to provide three elevation beams each 48-50 and 52-54. Each elevation beam in the configuration of FIG. 3 serves one of the three respective mobile wireless devices (or UEs) 56-58 and 60-62, as shown. It is observed here that when an eNB directs its transmitted power towards a specific UE, it may at the same time also direct the transmitted energy towards another UE that may be currently receiving its serving signal from another eNB. This situation is illustrated in FIG. 3 by the arrow 64, which shows that the directional signal transmission to the UE 57 served by the eNB 45 may also reach the UE 61 served by the other eNodeB 46. Thus, eNodeBs may cause interference to their neighboring cells when performing dynamic elevation beamforming, and this interference may be very harmful for the overall performance of the system or cellular network. In fact, it is possible that employing dynamic elevation beamforming in a communication system may not lead to a system-level gain such as, for example, when the increase in the received signal level by dynamic beam selection may be less than the simultaneous increase in the interference level.

As before, it is emphasized that elevation beamforming is used as an example only to illustrate how interference may arise in beamformed systems—whether utilizing elevation beamforming, azimuth beamforming, or joint azimuth and elevation beamforming. Furthermore, various elevation beam patterns shown in FIGS. 1-3 (and later in FIGS. 5-6) are also by way of examples only. In practice, a single base station may not provide all of such beam patterns, and different base stations may provide different types of elevation beam patterns having different angular power profile.

SUMMARY

As discussed above, an eNodeB's use of dynamic elevation beamforming may cause inter-cell interference in neighboring cells. When such interference exceeds a specific interference threshold, it may become undesirable. It is observed that all elevation beams utilized by a transmitting eNB may not necessarily cause inter-cell interference exceeding the allowable threshold. Rather, interference from certain specific beams at certain angular intervals may be troublesome. Hence, it is desirable to devise a mechanism for angular gap-constrained transmission. In other words, it may be desirable to avoid beamforming in certain angular intervals where the interference caused to other cells would be large. This may be seen as applying a kind of angular beamforming "mask", setting an upper bound on the radiated power in certain critical directions. Such transmission characteristics may be achieved by not offering elevation beam(s) in those critical directions, thereby creating a "gap" in the angular beam profile of the transmitting eNodeB.

FIG. 4 shows an exemplary plot 67 in which an angular beamforming mask is used to create a "gap" 70 in elevation beams in certain critical directions. The plot 67 is an angular power profile for a system—which may include a single base station or a group of base stations—that employs an angular beamforming mask to achieve the desired "gap" 70 to reduce the amount of interference generated at certain critical directions. The "gap" 70 is created when certain undesirable elevation beams are removed (or not transmitted) from one or more transmitting eNBs. Each eNB in the system may have a possible set of candidate elevation beams, some of which may need to be avoided to prevent the undesirable inter-cell interference.

It is therefore desirable to be able to design an angular beamforming mask. More specifically, it is desirable to determine where to put the "gap" in a system's angular power profile and how large such a gap should be. In realistic network deployment, the optimal "gap" may be site-specific and time-varying.

As a solution, particular embodiments of the present disclosure provide for a slow-scale coordination feature between a plurality of eNodeBs cooperating in a cluster to jointly derive a suitable "gap" in the angular power profile of each eNodeB. As discussed in more detail below, in certain embodiments, the present disclosure relates to utilizing the Discovery Reference Signal (DRS) based RSRP measurements of interfering beams from neighboring eNodeBs, and signaling a metric indicating a relative beam interference level. A brief discussion of the DRS mechanism is provided below.

In Release 12 of Third Generation Partnership Project's (3GPP) Long Term Evolution (LTE) standards, a new type of reference signal—the so-called Discovery Reference Signal (DRS)—was introduced. With the DRS, a UE may be configured by its serving eNB using the Radio Resource Control (RRC) protocol to measure up to 96 different Channel State Information-Reference Signal (CSI-RS) resources that potentially may be transmitted from different neighboring eNodeBs. The RRC configuration message comprises the following information, enabling the UE to locate the CSI-RS transmission:

```
MeasCSI-RS-Config-r12    ::=    SEQUENCE {
    measCSI-RS-Id-r12            MeasCSI-RS-Id-r12,
    physCellId-r12               INTEGER (0..503),
    scramblingIdentity-r12       INTEGER (0..503),
    resourceConfig-r12           INTEGER (0..31),
    subframeOffset-r12           INTEGER (0..4),
    csi-RS-IndividualOffset-r12  Q-OffsetRange,
    ...
}
```

More specifically, the physCellID-r12 parameter in the RRC configuration message above indicates the Physical Cell ID (PCI) of the cell (or eNB) transmitting the CSI-RS resource, enabling the UE to know which cell to synchronize to by listening to two cell-specific broadcast signals—the Primary Synchronization Sequence (PSS) signal, and the Secondary Synchronization Sequence (SSS) signal. In LTE, the PSS and SSS synchronization signals may be transmitted twice per 10 ms (millisecond) radio frame. The UE may then be instructed to calculate the RSRP on each of the CSI-RS resource of interest, and to report back the RSRP values to its serving eNodeB. Alternatively, for example, the UE may be configured to only report back an RSRP value of a CSI-RS resource if that value exceeds a certain threshold (referred to as "Event C1") or if that value becomes a pre-determined offset better than the RSRP value of a reference CSI-RS resource (referred to as "Event C3").

Additional discussion of the DRS mechanism—including various threshold events, like the above-mentioned Event C1 and Event C3—may be obtained from section 5.5 of the 3GPP Technical Specification (TS) 36.331, version 13.1.0 (March 2016), titled "3rd Generation Partnership Project; Technical Specification Group Radio Access Network; Evolved Universal Terrestrial Radio Access (E-UTRA); Radio Resource Control (RRC); Protocol Specification (Release 13)." The discussion in the section 5.5 of this 3GPP TS 36.331 is incorporated herein by reference in its entirety.

According to particular embodiments of the present disclosure, the DRS measurements may be used as a kind of cell selection signals in a beamforming system—whether utilizing elevation beamforming, azimuth beamforming, or joint elevation-azimuth beamforming. Using elevation beamforming as an example, each configured CSI-RS resource may be beamformed with a different elevation beam, possibly from different transmission points. Upon receiving RSRP measurements from a UE corresponding to these different elevation beams, the initial serving eNodeB may choose to handover the UE to the eNodeB offering the elevation beam with the strongest measured RSRP.

In one embodiment, the present disclosure is directed to a method in a transmitting network node for reducing inter-cell interference in a cellular telecommunication network in which the transmitting network node utilizes beamforming for directional signal transmission to wireless devices operating within a served cell. The transmitting network node dynamically selects a beam from a plurality of candidate beams for transmitting data to one or more of the wireless devices. The method comprises: (i) obtaining a level of inter-cell interference caused in a neighboring cell by transmissions in each of the plurality of candidate beams; (ii) removing from the plurality of candidate beams any beams that caused the level of inter-cell interference in the neighboring cell to exceed a high interference threshold, thereby creating a set of remaining candidate beams; and (iii) transmitting data to the wireless devices operating within the served cell utilizing only beams selected from the set of remaining candidate elevation beams.

In particular embodiments, the transmitting network node may perform the above method with each neighboring node. Furthermore, in some embodiments, the transmitting network node may utilize elevation beamforming, in which case each candidate beam may be a candidate elevation beam.

The transmitting node may obtain the level of inter-cell interference by: (i) transmitting a beam-specific reference signal in each of the plurality of candidate beams utilizing a different reference signal resource for each beam; (ii) instructing a neighboring network node serving the neighboring cell to request from wireless devices operating in the neighboring cell, signal quality measurements of a serving signal and the beam-specific reference signals; and (iii) receiving from the neighboring network node, a plurality of beam-specific interference metrics corresponding to the plurality of candidate beams.

In one embodiment, a beam-specific interference metric may be a difference between an RSRP value of the serving signal and an RSRP value of a beam-specific CSI-RS resource measured by a wireless device operating in the neighboring cell.

In certain embodiments, the DRS mechanism may be used to transmit the beam-specific reference signal, and the reference signal resource may be a CSI-RS resource. In that case, the transmitting network node may instruct the neighboring network node to RRC configure the wireless devices operating in the neighboring cell to measure and report a respective RSRP value of each beam-specific CSI-RS resource.

In one embodiment, the transmitting network node may remove the undesirable beams by performing the following: (i) for a beam-specific CSI-RS resource, generating a resource-specific average value of all beam-specific interference metrics received from the plurality of neighboring network nodes for a candidate beam mapped to the beam-specific CSI-RS resource; (ii) for the beam-specific CSI-RS resource, comparing the resource-specific average value against the high interference threshold; and (iii) removing the candidate beam mapped to the beam-specific CSI-RS resource from the plurality of candidate beams if the resource-specific average value exceeds the high interference threshold.

In another embodiment, the present disclosure is directed to a method of reporting of inter-cell interference information by a first network node to a second network node associated with the first network node, wherein the second network node utilizes beamforming for directional signal transmission to wireless devices operating within a served cell. The beamforming may be elevation beamforming in certain embodiments. The method comprises performing the following by the first network node: (i) receiving an instruction from the second network node; (ii) in response to the instruction, obtaining, from one or more wireless devices served by the first network node, a device-specific RSRP value of a beam-specific reference signal transmitted by the second network node in a beam; (iii) generating a beam-specific interference metric for the beam based on all reported device-specific RSRP values, wherein the beam-specific interference metric represents a level of inter-cell interference caused by the beam in a neighboring cell served by the first network node; and (iv) transmitting the beam-specific interference metric to the second network node.

The instruction from the second node may be received as part of a DRS procedure, and the device-specific RSRP value may be obtained by using RRC protocol to obtain the device-specific RSRP value of a beam-specific CSI-RS resource transmitted by the second network node for the beam (which may be an elevation beam).

In one embodiment, the first network node may further perform the following: (i) for a target wireless device served by the first network node, determine that the device-specific interference metric of the target wireless device is above a pre-defined threshold; and (ii) issue a handover command to handover the target wireless device to the second network node. Furthermore, when the first network node also employs beamforming and utilizes the serving beam for directional signal transmission to the target wireless device, the first network node may remove the serving beam from a set of beams used by the first network node for data transmissions. In certain embodiments, the first network node may also employ elevation beamforming.

In one embodiment, the first network node may directly signal the entire value of the beam-specific interference metric to the second network node. Alternatively, the first network node may signal the beam-specific interference metric to the second network node only if the beam-specific interference metric is above a pre-defined threshold. In another embodiment, the first network node may use a single bit—to indicate if the corresponding beam falls into the high or low interference category—to indirectly signal the value of the beam-specific interference metric to the second network node.

In a further embodiment, the present disclosure is directed to a method of managing inter-cell interference in a cellular network in which a transmitting network node utilizes beamforming for directional signal transmission to wireless devices operating within a served cell. The transmitting network node dynamically selects a beam from a plurality of candidate beams for transmitting data to one or more of the wireless devices and is in operative communication with a central node. As before, in particular embodiments, the transmitting network node may utilize elevation beamforming with a plurality of candidate elevation beams. The method comprises performing the following by the central node: (i) obtaining a level of inter-cell interference caused in a neighboring cell by transmissions in each of the plurality of candidate beams; (ii) identifying any beams that caused the level of inter-cell interference in the neighboring cell to exceed a high interference threshold; (iii) performing one of the following based on the identification: (a) removing any identified beams from the plurality of candidate beams, thereby creating a set of remaining candidate beams, and (b) instructing the transmitting network node to remove any identified beams from the plurality of candidate beams and to thereby create the set of remaining candidate beams; and (iv) instructing the transmitting network node to transmit data to the wireless devices operating within the served cell utilizing only beams selected from the set of remaining candidate beams.

In yet another embodiment, the present disclosure is directed to a transmitting network node in a cellular network for performing data transmissions using beamforming. The transmitting network node comprises: (i) a transceiver; (ii) a memory; and (iii) a processor. The transceiver is operable to perform the following: (a) transmit a beam-specific reference signal in each beam in a first set of beams, and (b) receive a node-specific set of beam interference metrics from each receiving node in a plurality of receiving nodes associated with the transmitting network node. The memory may store program instructions. The processor may be coupled to the transceiver and the memory and operable to execute the program instructions, which, when executed by the processor, cause the transmitting network node to perform the following: (a) generate the beam-specific reference signal for each beam in the first set of beams; (b) instruct each receiving node to provide a beam-specific interference metric for each beam in the first set of beams, wherein each beam-specific interference metric represents a level of interference caused by a corresponding beam in the first set of beams in a neighboring cell served by a respective receiving node; (c) use received sets of beam interference metrics to determine which one or more beams are to be removed from the first set of beams to obtain a second set of beams, wherein the second set of beams is a subset of the first set of beams; and (d) perform data transmissions using the transceiver and utilizing only the beams from the second set of beams. In particular embodiments, the transmitting node may use elevation beamforming—with a set of elevation beams—for data transmission.

In one embodiment, the transmitting network node may be one of the following: (i) a Radio Base Station (RBS); (ii) an evolved Node B (eNodeB or eNB); and (iii) a node used as a base station.

In the context of dynamic beamforming, the methodology discussed herein may reduce the level of interference in the wireless communication system by using a simple, slow-scale coordination feature in which a plurality of base stations in the system cooperate to jointly derive a suitable "gap" in the angular power profile of each base station. Thus, a reduced complexity alternative is provided to a fast-scale coordinated beamforming scheme, where explicit channels of victim UEs must be estimated and null-formed towards. In the slow-scale methodology as per particular embodiments of the present disclosure, explicit channel information of victim UEs is not needed; rather, certain beam directions are avoided based on implicit measurements.

BRIEF DESCRIPTION OF THE DRAWINGS

In the following section, the present disclosure will be described with reference to exemplary embodiments illustrated in the figures, in which:

FIG. 4 shows an exemplary plot in which an angular beamforming mask is used to create a "gap" in elevation beams in certain critical directions;

FIG. 5 illustrates an exemplary eNodeB 75 offering a possible set of seven candidate elevation beams for data transmission;

FIG. 6 shows a restricted set of five candidate elevation beams obtained from the possible set of seven beams in FIG. 5, thereby creating a "gap" in the angular power profile of the eNodeB in FIG. 5 according to one embodiment of the present disclosure;

FIG. 10 shows an exemplary flowchart depicting how the interference management scheme as per particular embodiments of the present disclosure may be performed in a centralized manner;

DETAILED DESCRIPTION

Figure 1:
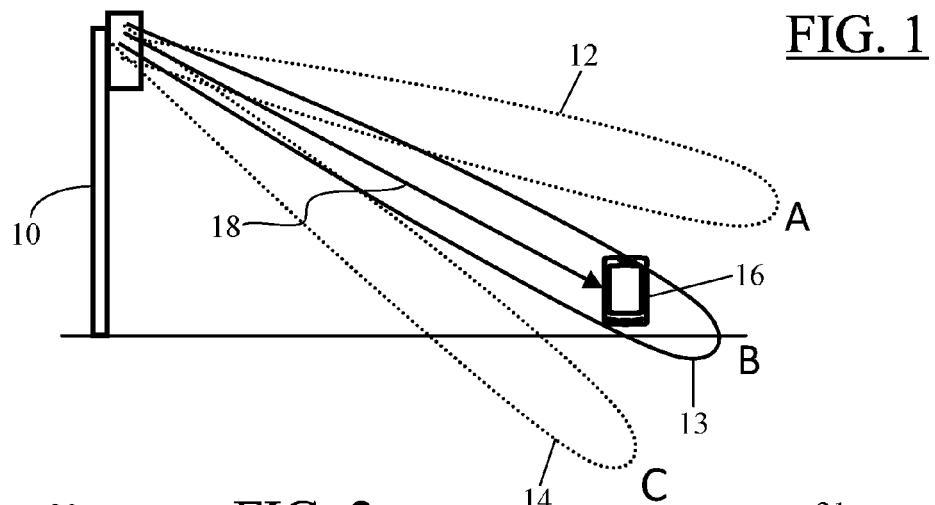
FIG. 1 illustrates an example of a dynamic elevation beam selection.
Figure 2:
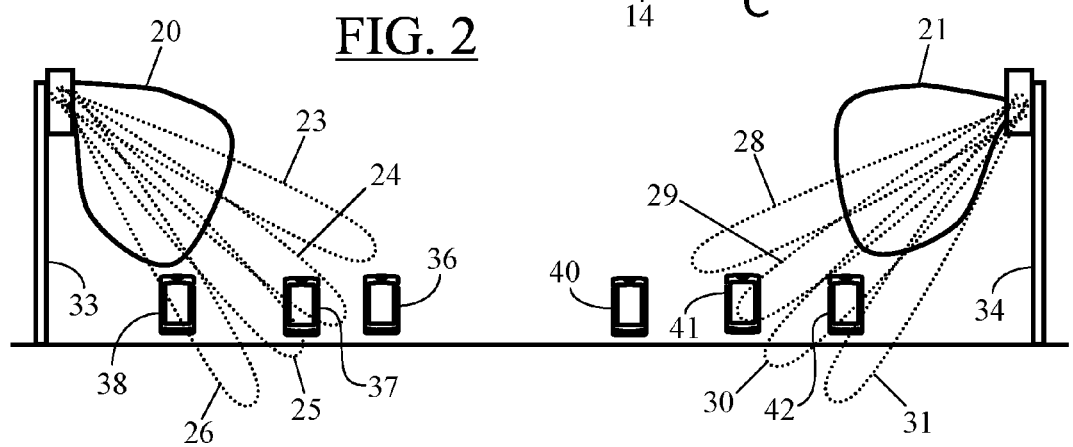
FIG. 2 depicts cell selection beams along with data transmission beams in an elevation beamforming system.

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure. It should be understood that the disclosure is described primarily in the context of a Third Generation Partnership Project (3GPP) cellular telephone/data network such as, for example, an LTE network, but it can be implemented in other forms of cellular or non-cellular wireless networks as well so long as the base stations or similar transmitting nodes in the network utilize beamforming. Thus, the use of the term "cell" in the discussion below should not be construed to be limited to a cellular structure only.

It is pointed out at the outset that the discussion herein primarily focuses on elevation beamforming as an example only. For the sake of brevity, all different types of beamforming techniques—such as, for example, azimuth beamforming, or joint azimuth and elevation beamforming using a 2D antenna array—are not discussed in the context of the present disclosure. However, the teachings of the present disclosure remain applicable to any type of beamforming where, for example, beams from a set of candidate beams are dynamically selected for data transmission. Thus, the term "beamforming", as used herein, may include not only elevation beamforming, but azimuth beamforming or joint elevation-azimuth beamforming as well, depending on the implementation.

As discussed in more detail below, in particular embodiments of the present disclosure, a set of eNodeBs co-operate together in such a way that: (i) A group of neighboring eNodeBs in the co-operation cluster may be instructed by a network node—using the DRS framework—to RRC configure respective UEs served by each neighboring eNodeB to measure upon a set of CSI-RS resources transmitted from a transmitting eNodeB in the cluster. (ii) The neighboring eNodeBs may signal a set of interference metrics to the network node.

It is observed here that, in some embodiments, the co-operating cluster may be controlled by a central node that coordinates the interference management procedure as per teachings of the present disclosure. In that case, the central node may function as the aforementioned network node instructing the eNodeBs to request measurements on the set of CSI-RS resources corresponding to a certain transmitting eNodeB. Similarly, the central node also may be the network node that receives the signaling of the interference metrics from various neighboring eNodeBs.

In other embodiments, however, the interference management scheme as per teachings of the present disclosure may be performed in a distributed fashion, and the instructing network node may be one of the eNodeBs in the co-operating cluster, instructing its peer eNodeBs.

Thus, although the discussion below primarily focuses on the distributed approach, it is understood that the teachings of the present disclosure may be implemented in a centralized manner as well.

FIG. 5 illustrates an exemplary eNodeB 75 offering a possible set of seven candidate elevation beams 77-83 for data transmission. FIG. 6, on the other hand, shows a restricted set of five candidate elevation beams 77 and 80-83 obtained from the possible set of seven beams 77-83 in FIG. 5, thereby creating a "gap" in the angular power profile of the eNodeB 75 in FIG. 5 according to one embodiment of the present disclosure. The eNodeB 75 may eventually utilize the restricted set of beams in FIG. 6 for data transmissions within the cell associated therewith. It is noted here that the terms "restricted set of beams," "restricted set of candidate beams," "remaining candidate beams," "remaining candidate elevation beams", or other terms of similar import are used interchangeably herein. As discussed in more detail below, the present disclosure provides a methodology to construct the restricted set of beams from the possible set of beams to manage interference such as, for example, inter-cell interference.

Figure 3:
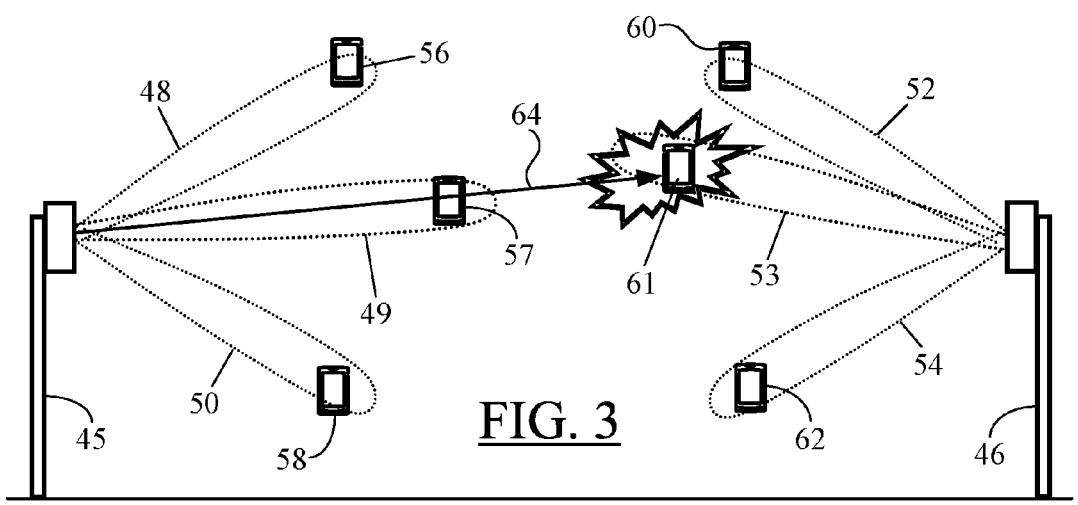
FIG. 3 is an exemplary illustration of how dynamic elevation beamforming may cause interference.

The eNodeB 75 in FIGS. 5-6 may be a part of a cooperation cluster of multiple eNodeBs (not shown). A co-operation cluster may be a set of sites/eNBs that cooperate—for example, by means of the X2 interface (mentioned later below)—for serving their users. Such cooperation may allow for interference reduction, leading to improved overall performance. Each eNodeB in the cluster may be using dynamic elevation beamforming and may have the potential to offer a set of beams in different directions for data transmission. However, as discussed before with reference to FIG. 3, beamforming in some directions may cause a significant amount of interference and may be harmful for system performance. Therefore, for a transmitting eNodeB utilizing elevation beamforming, it is desirable to determine which beams, if any, should be removed from the set of possible beams for data transmission. Thus, as shown in FIGS. 5-6, a restricted set of beams in FIG. 6 may be constructed for eventual data transmission from a possible set of beams in FIG. 5. To manage the interference caused by the dynamic elevation beamforming of eNodeB 75, the beams 78-79 in the possible set of beams in FIG. 5 may be removed as per teachings of the present disclosure (discussed in more detail below) to obtain the restricted set of beams in FIG. 6. The eNodeB 75 then may use the restricted set of candidate beams 77, 80-83 in FIG. 6 for data transmissions to/from the UEs attached thereto.

Prior to discussing the details of how candidate elevation beams may be removed from the possible set of beams so as to obtain the restricted set of elevation beams, a brief overview of the system in which the teachings of the present disclosure may be implemented is provided below.

Figure 7:
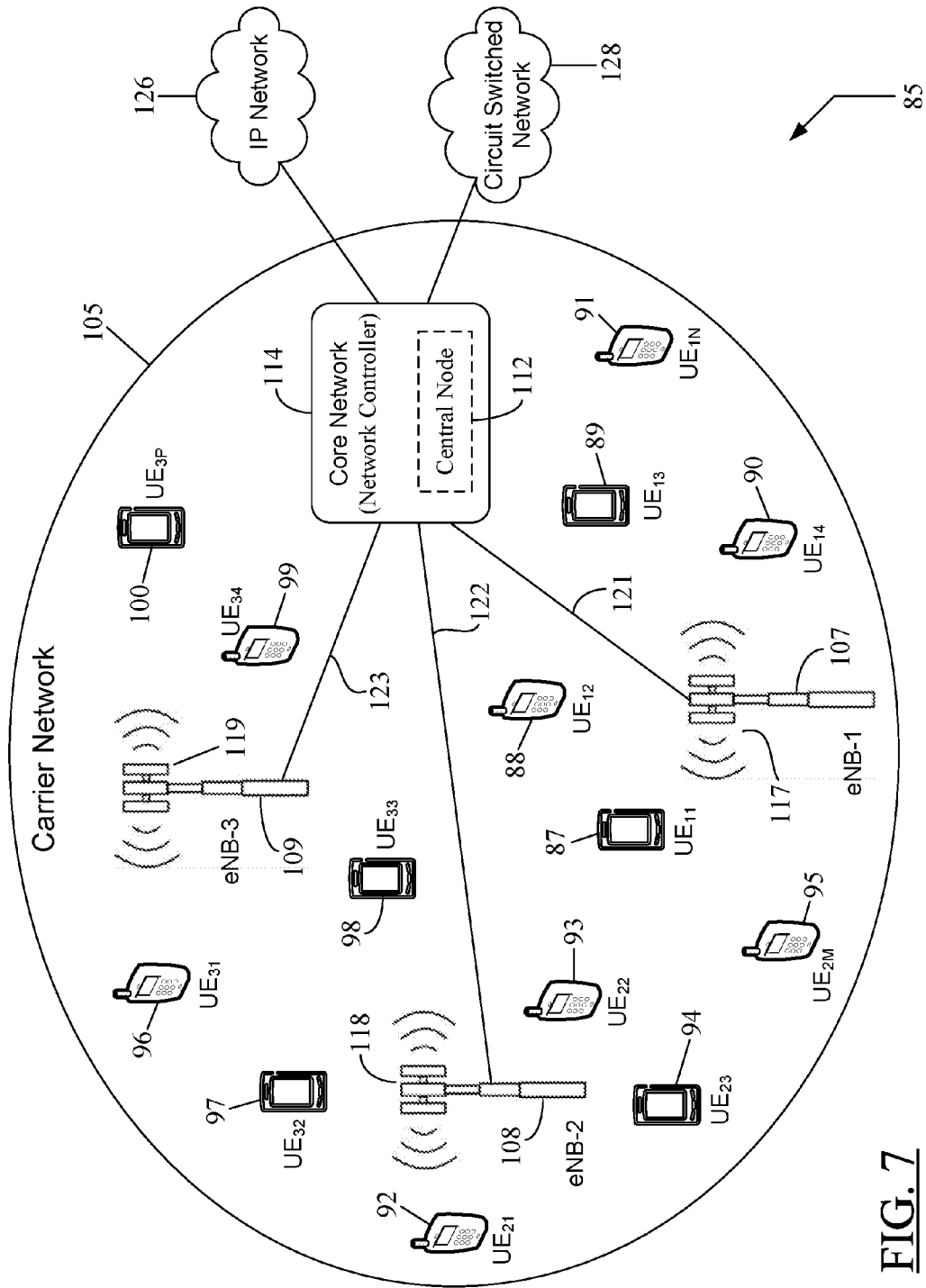
FIG. 7 shows an exemplary wireless system in which the interference management scheme shown in FIGS. 8-10 according to particular embodiments of the present disclosure may be implemented.
Figure 8:
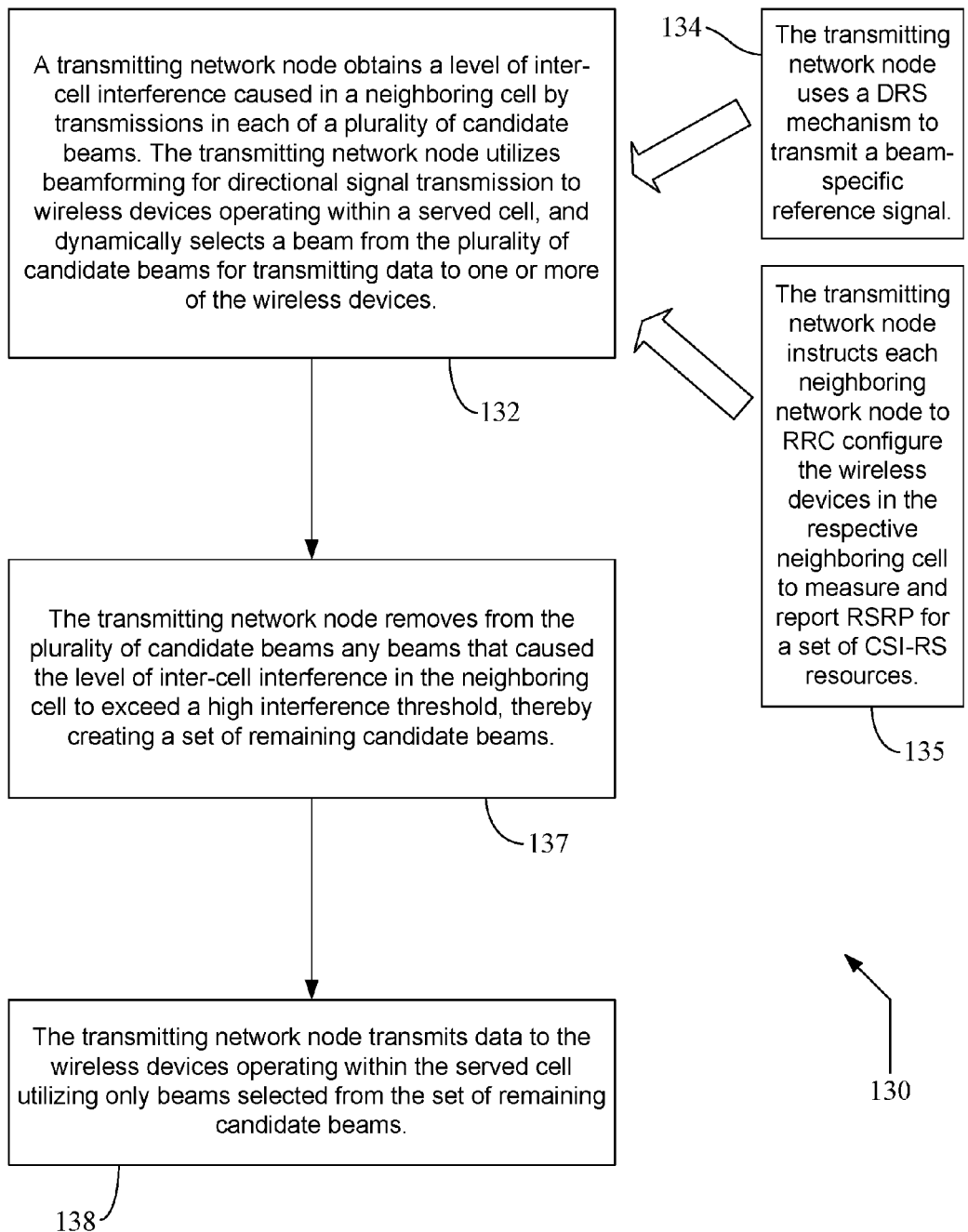
FIG. 8 is an exemplary flowchart illustrating a transmitting network node-based process for removal of interfering beams according to one embodiment of the present disclosure.
Figure 9:
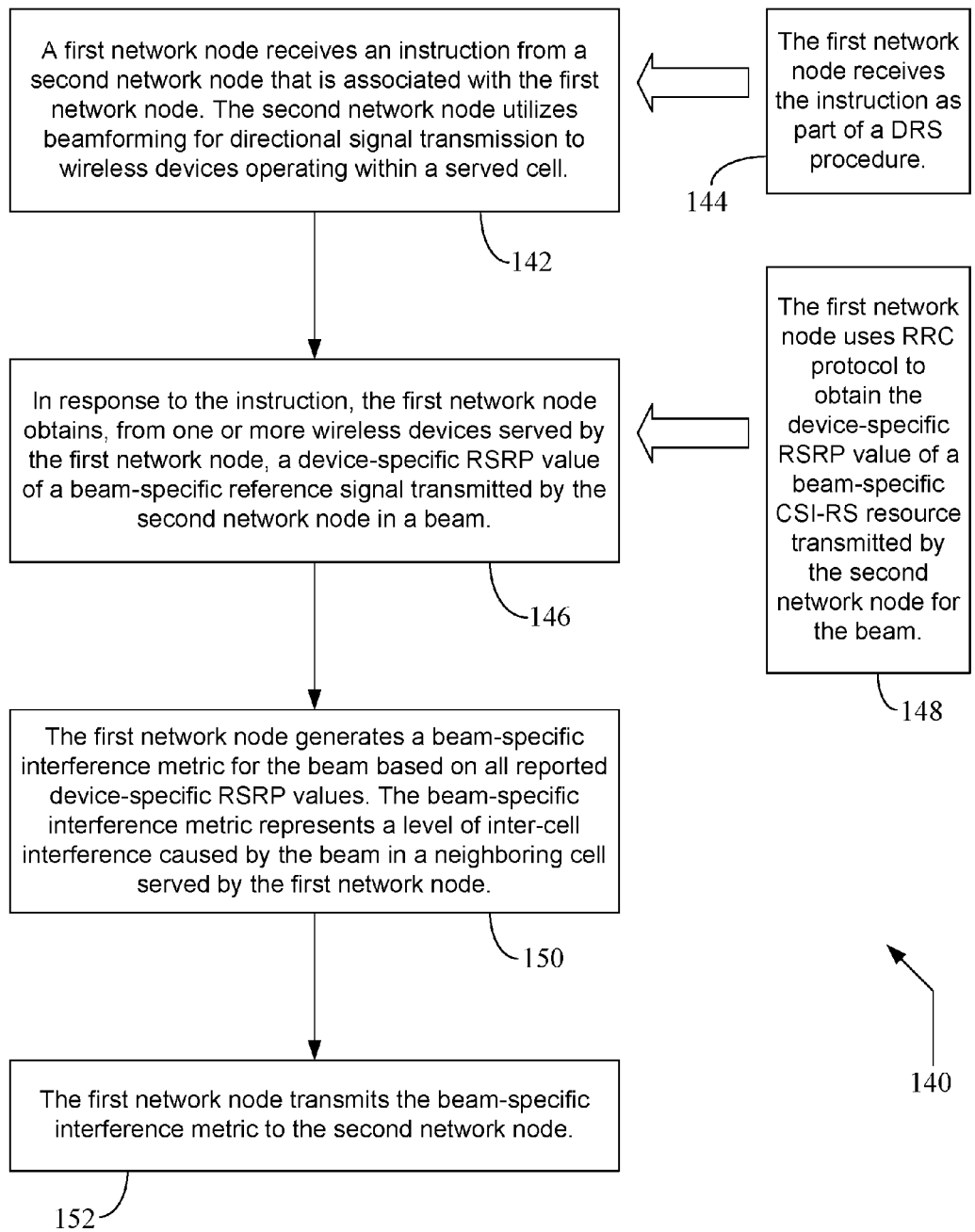
FIG. 9 is an exemplary flowchart illustrating a neighboring network node-based process according to one embodiment of the present disclosure for reporting beam-specific interference metric for a beam in a beamforming scheme utilized by a transmitting network node for directional signal transmissions.

FIG. 7 shows an exemplary wireless system 85 in which the interference management scheme shown in FIGS. 8-10 according to particular embodiments of the present disclosure may be implemented. A number of exemplary wireless devices 87-100 may be operational in the system 85 through a mobile communication network 105. These wireless devices 87-100 may be attached to, served by, or under operational control of their respective network nodes 107-109. More specifically, in the embodiment of FIG. 7, "N" wireless devices 87-91 are served by the network node 107, "M" wireless devices 92-95 are served by the network node 108, and "P" wireless devices 96-100 are served by the network node 109. It is understood that the numerals "N", "M", and "P" may be different. Some of the wireless devices may be mobile, whereas some may be stationary. It is also understood that there may be many more such wireless devices and network nodes operational in the communication network 105. However, for ease of illustration and simplicity of discussion, only a few of them are shown in FIG. 7.

In the discussion herein, the terms "wireless network," "mobile communication network," "operator network," or "carrier network" may be used interchangeably to refer to a wireless communication network 105 that facilitates voice and/or data communication with different types of wireless devices, like the devices 87-100. The carrier network 105 may be a cellular network, a proprietary data communication network, a corporate-wide wireless network, and the like.

In one embodiment, each of the wireless devices 87-100 may be a UE or a Mobile Station (MS) capable of receiving/sending data content such as, for example, audio data as part of a voice call, audio-visual data as part of a video call, textual, graphical, and/or pictorial data associated with online gaming, and the like, from/to the network 105. The wireless devices 87-100 may be referred to by such analogous terms as "mobile handset," "wireless handset," "mobile device," "mobile terminal," and the like. Some examples of UEs or mobile handsets/devices include cellular telephones or data transfer equipments, smartphones, handheld or laptop computers, Bluetooth® devices, electronic readers, portable electronic tablets, and the like. The data transfer equipment may include a Personal Digital Assistant (PDA) or a pager. The smartphones may include, for example, iPhones™, Android™ phones, Blackberry™ devices, and the like. A stationary wireless device may include, for example, a Machine-to-Machine (M2M) communication device.

In the embodiment of FIG. 7, the carrier network 105 is shown to include three exemplary network nodes 107-109. In the discussion herein, the term "network node" may be interchangeably used to refer to a base station (BS) or an eNodeB/eNB. Furthermore, for ease of discussion, a network node, such as the nodes 107-109, may be distinguished from a central node, such as the central node 112 in a Core Network (CN) 114 (discussed in more detail later below). Each of the network nodes 107-109 and the central node 112 may be configured to implement the teachings of the present disclosure to manage interference in the network 105 as, for example, when dynamic elevation beamforming is employed by one or more of the network nodes 107-109.

Each network node 107-109 may be equipped with a respective antenna array (or antenna unit) 117-119 to enable the network node to provide Radio Frequency (RF) coverage or radio interface to wireless devices operating within the cell (not shown) associated with the network node. The network node may provide the RF coverage to the attached devices via the respective antenna unit, and with or without the help of a secondary node such as a pico or femto base station (not shown). It is noted here that when the wireless network 105 is a cellular LTE network, each of the eNBs 107-109 may be associated with a particular cell—known as the eNB's "source cell"—and may provide RF coverage to the corresponding UEs as its source/serving eNB. A UE may be served by an eNB because it may be physically present, registered, associated with, for example, through RF coverage or prior handover, or operating within the eNB's source cell (not shown). As noted before, a "cell" and its associated base station such as, for example, an eNB (or eNodeB) may be referred to in an interchangeable manner using the same reference numeral. For example, the mobile device 87 may be interchangeably referred to as performing data communication with its base station 107 or the cell 107.

In one embodiment, the antenna array (or antenna unit) 117-119 of a respective base station 107-109 may include a steerable antenna array that can provide multiple radio beams like those shown in FIG. 5. In another embodiment, the antenna array may comprise of separate transmission and reception arrays. In yet another embodiment, the antenna array may include a single antenna element or multiple antenna elements—such as, for example, in the form of an active antenna—to allow the antenna array to transmit and receive analog beamformed signals in one or a few beams simultaneously. Alternatively, the antenna array may transmit and receive beamformed signals using multiple beams sequentially, such as, for example, in a time-multiplexed manner. In particular embodiments, each base station 107-109 may be operable to perform data transmissions utilizing one of the earlier-mentioned beamforming techniques—elevation beamforming, azimuth beamforming, or a joint elevation-azimuth beamforming (with a 2D antenna array). In other embodiments, at least one of the base stations 107-109 may employ beamforming, whereas some other do not. For ease of discussion, the antenna array 117-119 may not be explicitly mentioned every time a transmission/reception by the respective base station 107-109 is discussed. It is, however, understood that a BS's communication with respective wireless devices is through the corresponding antenna unit.

In addition to providing air interface or communication channels to respective UEs 87-100, the base stations 107-109 may also perform radio-resource management using, for example, channel feedbacks received from the respective UEs. Furthermore, the network nodes 107-109 may be part of a cellular network 105 where no Carrier Aggregation (CA) is present. However, it is understood that the teachings of the present disclosure may equally apply to a CA-based cellular configuration as well.

Thus, terminals—such as the wireless devices 87-100—operating in the wireless network 105 and attached to the respective base stations 107-109 may exchange information with one another via the base stations 107-109. The wireless network 105 may be a dense network with a large number of wireless terminals operating therein. For ease of illustration, only a few of such devices are shown in FIG. 7. The carrier network 105 may support stationary as well as mobile devices. The mobile communication network 105 may be a cellular carrier network operated, managed, and/or owned by a wireless service provider (or operator).

In one embodiment, each network node 107-109 may be a base station in a Third Generation (3G) cellular network, an eNodeB in a Fourth Generation (4G) cellular network, a home base station, a femtocell, or any other node used as a base station in the network 105, and may provide radio interface to respective mobile handsets attached thereto. It is observed here that all network nodes 107-109 may not be identical to each other or may not have identical functionality. Furthermore, in other embodiments, any of the base stations 107-109 may also include the functionality of a site controller, an access point (AP), a radio tower, or any other type of radio interface device capable of operating in a wireless environment.

As noted before, each base station (BS) 107-109 may be interchangeably referred to as a "network node." Additionally, any of the base stations 107-109 also may be referred to as an "access node" or a "mobile communication node." In case of a 3G carrier network 105, the base stations 107-109 may include functionalities of a 3G Radio Base Station (RBS). In certain embodiments, a 3G RBS may also include some or all functionalities of a 3G Radio Network Controller (RNC). Communication nodes in other types of carrier networks such as, for example, Second Generation (2G) or Fifth Generation (5G) networks, and beyond, also may be configured similarly. In case of a distributed approach, any or all of the network nodes 107-109 may be configured (in hardware, via software, or both) to implement some or all of the interference management aspects as per teachings of the present disclosure. Similarly, in case of a centralized approach, the central node 112 may be configured (in hardware, via software, or both) to implement some or all of the interference management aspects as per teachings of the present disclosure. For example, when existing hardware architecture of a network node or a central node cannot be modified, the DRS scheme-based interference management according to one embodiment of the present disclosure may be implemented through suitable programming of one or more processors in the network node or the central node, as applicable. Such processor(s) may be, for example, the processor 165 in FIG. 11 or the processor 175 in FIG. 12. Upon execution of the program code by a processor in the respective network node 107-109, the network node may be operative to perform various eNB-related functions discussed later with reference to FIGS. 8-9. Similarly, upon execution of the program code by a processor in the central node 112, the central node may be operative to perform various functions discussed later with reference to FIG. 10. Thus, in the discussion below, although a node—whether a network node or a central node—may be referred to as "performing," "accomplishing," or "carrying out" a function or process, it is evident to one skilled in the art that such performance may be technically accomplished in hardware and/or software as desired.

Although the discussion herein primarily refers to a base station or an eNB as a "network node," it is understood that in certain embodiments the term "network node" may refer to, for example, a macro base station operating in conjunction with a secondary node such as a pico or femto base station, a secondary node such as a pico or femto base station, a group of base stations, a Base Transceiver Station (BTS)—with or without the functionalities of a Base Station Controller (BSC), a distributed eNB, or a combination of one or more base stations—with or without the functionalities of a BSC or an RNC—and a Core Network (CN). For example, if certain RNC functionalities are distributed between a BS/eNB and a CN, then the "network node" may be a combination of such a BS/eNB and the CN. On the other hand, in particular embodiments, a combination of multiple base stations or a single BS and some other node(s) (not shown) may constitute a "network node", such as, for example, in case of a Coordinated Multi-Point (CoMP)

transmission/reception arrangement. Another node, which may be IP-based, in the network 105 or in the wireless system 85 other than those mentioned above may be configured to perform as a "network node" as per the teachings of the present disclosure. Any of the network nodes mentioned herein may "perform," "accomplish," or "carry out" a function or process using a suitably-configured hardware and/or software as desired.

The eNBs 107-109 in the embodiment of FIG. 7 are shown to be served and controlled by the Core Network (CN) 114. It is understood that there may be additional core networks (not shown), either in the same operator's network 105 or in other carrier networks (not shown) in the wireless system 85. When the carrier network 105 is an LTE network, the eNBs 107-109 may be connected to the CN 114 via a respective "S1" interface—illustrated by way of exemplary lines 121-123. Furthermore, when the carrier network 105 is an LTE network, the eNBs 107-109 may be connected to each other via respective "X2" interfaces (not shown). Hence, in particular embodiments, the eNB-to-eNB communication required as per teachings of the present disclosure may be accomplished through such X2 interfaces. The core network 114 may provide logical and control functions such as, for example, terminal mobility management; access to external networks or communication entities; subscriber account management, billing, supporting the delivery of a subscriber-selected service such as a Voice over LTE (VoLTE) voice call service, and the like; Internet Protocol (IP) connectivity and interconnection to other networks (e.g., the Internet) or entities; roaming support; and so on.

Figure 11:
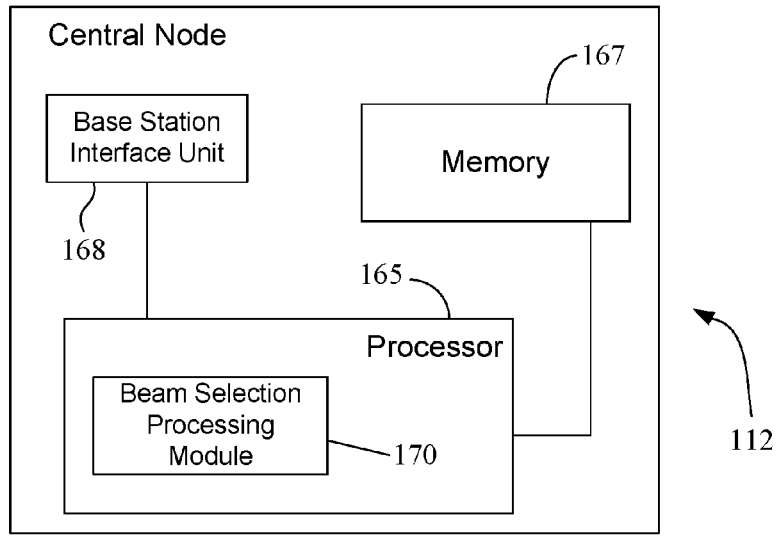
FIG. 11 is a block diagram of an exemplary central node according to one embodiment of the present disclosure.

In the embodiment of FIG. 7, the CN 114 is shown to include the central node 112, which may be configured to perform the methodology illustrated in FIG. 10. However, in other embodiments, the functionality of the central node may be implemented elsewhere in the carrier network 105, or as part of an existing node (not shown) or feature of the core network 114. FIG. 11, discussed later, is an exemplary block diagram of a central node. It is noted here that the central node 112 is shown dotted in FIG. 7 because it may be absent in certain network configurations where a distributed approach—which is discussed later with reference to FIGS. 8-9—is used for interference management as per teachings of the present disclosure.

In case of an LTE carrier network 105, the CN 114 may include some or all functionalities of an Access Gateway (AGW) or an Evolved Packet Core (EPC), or may function in conjunction with a subnet-specific gateway/control node (not shown). In certain embodiments, the CN 114 may be, for example, an International Mobile Telecommunications (IMT) CN such as a 3GPP CN. In other embodiments, the CN 114 may be, for example, another type of IMT CN such as a 3GPP2 CN (for Code-Division Multiple Access (CDMA) based cellular systems), or an ETSI TISPAN (European Telecommunications Standards Institute TIPHON (Telecommunications and Internet Protocol Harmonization over Networks) and SPAN (Services and Protocols for Advanced Networks)) CN.

Regardless of the type of the carrier network 105, the core network 114 may function to provide connection of one or more of the UEs, like the UEs 87-100, to their respective eNBs 107-109 and, through the eNBs, to other mobile handsets or wireless devices operating in the carrier network 105 and also to other communication devices or resources in other voice and/or data networks external to the carrier network 105. The communication devices may include wireline or wireless phones, whereas the resources may include an Internet website. The core network 114 may be coupled to a packet-switched network 126 such as, for example, an Internet Protocol (IP) network like the Internet as well as to a circuit-switched network 128, such as the Public Switched Telephone Network (PSTN), to accomplish the desired connections for the UEs 87-100 beyond the devices operating in the carrier network 105. Thus, through an eNB's connection to the core network 114 and a UE's radio link with that eNB, a user of the UE—like the UE 87—may wirelessly (and seamlessly) access many different resources or systems beyond those operating within the operator's network 105.

The carrier network 105 may be a cellular telephone network, a Public Land Mobile Network (PLMN), or a non-cellular wireless network which may be a voice network, data network, or both. As noted earlier, the carrier network 105 may include multiple cell sites (not shown). A wireless terminal, such as the UE 87, may be a subscriber unit in the carrier network 105. Furthermore, portions of the carrier network 105 may include, independently or in combination, any of the present or future wireline or wireless communication networks such as, for example, the PSTN, an IP Multimedia Subsystem (IMS) based network, or a satellite-based communication link. Similarly, as also mentioned above, the carrier network 105 may be connected to the Internet via its core network's 114 connection to the IP network 105 or may include a portion of the Internet as part thereof. In one embodiment, the operator network 105 or the wireless system 85 may include more or less or different types of functional entities than those shown in FIG. 7.

Although various examples in the discussion below are provided primarily in the context of an LTE network, the teachings of the present disclosure may equally apply, with suitable modifications as may be apparent to one skilled in the art using the present teachings, to a number of different Frequency-Division Multiplex (FDM) or Time-Division Multiplex (TDM) based wireless systems or networks—cellular or non-cellular—that may utilize beamforming. Such networks or systems may include, for example, standard-based systems/networks using Second Generation (2G), Third Generation (3G), Fourth Generation (4G), or Fifth Generation (5G) specifications, or non-standard based systems. Some examples of such systems or networks include, but not limited to, Global System for Mobile communications (GSM) networks, Telecommunications Industry Association/Electronic Industries Alliance (TIA/EIA) Interim Standard-136 (IS-136) based Time-Division Multiple Access (TDMA) systems, Wideband Code-Division Multiple Access (WCDMA) systems, 3GPP LTE networks, WCDMA-based High-Speed Packet Access (HSPA) systems, 3GPP2's CDMA-based High-Rate Packet Data (HRPD) systems, Ultra Mobile Broadband (UMB) systems including CDMA2000 or TIA/EIA IS-2000 systems and Evolution-Data Optimized (EV-DO) systems, Worldwide Interoperability for Microwave Access (WiMAX) systems based on Institute of Electrical and Electronics Engineers (IEEE) standard IEEE 802.16e, International Mobile Telecommunications-Advanced (IMT-Advanced) systems such as LTE Advanced systems, other Universal Terrestrial Radio-Access Networks (UTRAN) or Evolved-UTRAN (E-UTRAN) networks, GSM/Enhanced Data Rate for GSM Evolution (GSM/EDGE) systems, a non-standard based proprietary corporate wireless network, and so on.

FIG. 8 is an exemplary flowchart 130 illustrating a transmitting network node-based process for removal of interfering beams according to one embodiment of the present disclosure. In the context of the system 85 in FIG. 7, any one of the eNodeBs 107-109 may be referred to as a "transmitting network node", and the remainder of the eNodeBs may be referred to as "neighboring network nodes." For ease of reference, the discussion of FIGS. 8-10 below treats the eNodeB 107 as the transmitting network node, and the eNodeBs 108-109 as neighboring network nodes. The network nodes 107-109 may be considered to be part of a co-operating cluster within the network 105, and the interference management approach discussed with reference to FIGS. 8-9 may be performed in a distributed fashion, as opposed to the centralized approach discussed later with reference to FIG. 10. In the distributed approach, each eNodeB 107-109 in the cooperation cluster may instruct—sequentially or simultaneously—other eNodeBs in the cluster to provide interference measurements on the candidate beams used by the instructing eNodeB for directional signal transmissions. In this manner, relative beam interference level may be determined within the network 105 and, hence, the eNodeBs 107-109 can jointly derive a suitable "gap" in the angular power profile of each eNodeB.

Referring now to FIG. 8, at block 132, the transmitting network node 107 may first obtain a level of inter-cell interference caused in a neighboring cell—such as, for example, the cell associated with or served by the neighboring network node 108, and the like—by transmitting node's transmissions in each of a plurality of candidate beams. The transmitting network node 107 may utilize beamforming for directional signal transmission to wireless devices—such as, for example, the devices 87-91 in FIG. 7—operating within a cell (not shown) served by the transmitting node 107. As noted before, the beamforming may be elevation beamforming, azimuth beamforming, or a joint elevation-azimuth beamforming. For the sake of comparison and illustration, the candidate beams here may be considered similar to the possible set of beams shown in FIG. 5. The transmitting network node 107 may dynamically select a beam from the plurality of candidate beams for transmitting data to one or more of the wireless devices 87-91. As noted at block 134, in one embodiment, the transmitting node 107 may use the earlier-mentioned Discovery Reference Signal (DRS) mechanism to transmit a beam-specific reference signal as part of obtaining the level of inter-cell interference. Furthermore, in one embodiment, as part of the DRS mechanism, the transmitting network node 107 also may instruct each neighboring network node 108-109 to RRC configure the wireless devices in the respective neighboring cell to measure and report RSRP for a set of CSI-RS resources (block 135). Each candidate beam may be mapped to a beam-specific CSI-RS resource, as discussed in more detail below. In the context of FIG. 7, the neighboring network node 108 may RRC configure its associated wireless devices 92-95 and the neighboring network node 109 may RRC configure its associated wireless devices 96-100.

At block 137, the transmitting network node 107 may remove from the plurality of candidate beams any beams that caused the level of inter-cell interference in a neighboring cell to exceed a high interference threshold. Thus, the removal of undesirable beams may create a set of remaining candidate beams.

As noted at block 138, in one embodiment, the transmitting network node 107 may transmit data to the wireless devices 87-91 operating within its served cell (not shown) utilizing only the beams selected from the set of remaining candidate beams (created at block 137). For the sake of comparison and illustration, the remaining candidate beams here may be considered similar to the restricted set of beams shown in FIG. 6. The removal of interfering beams in the manner shown in FIG. 8 may provide a suitable "gap" in the angular power profile of the transmitting network node 107 to manage the inter-cell interference within the carrier network 105.

FIG. 9 is an exemplary flowchart 140 illustrating a neighboring network node-based process according to one embodiment of the present disclosure for reporting beam-specific interference metric for a beam in a beamforming scheme utilized by a transmitting network node for directional signal transmissions. In the context of FIG. 9, the term "first network node" refers to a neighboring network node, such as, for example, the network node 108 or 109 in FIG. 7, whereas the term "second network node" refers to the transmitting network node 107. As noted at block 142, the first network node may initially receive an instruction from the second network node, which may utilize beamforming for directional signal transmission to wireless devices—such as devices 87-91—operating within a served cell, such as, for example, the cell (not shown) associated with or served by the second network node. The first network node may receive the instruction as part of a DRS procedure (block 144).

In response to the instruction at block 142, the first network node may obtain, from one or more wireless devices served by the first network node, a device-specific RSRP value of a beam-specific reference signal transmitted by the second network node in a beam (block 146). For example, if the network node 108 is the first network node, it may obtain the device-specific RSRP values from the wireless devices 92-95 for a specific beam utilized by the second network node (here, the network node 107) for transmission of beamformed reference signals. As noted at block 148, as part of the DRS procedure, the first network node may use the earlier-mentioned RRC protocol to obtain the device-specific RSRP value of a beam-specific CSI-RS resource transmitted by the second network node for the beam under consideration.

At block 150, the first network node may generate a beam-specific interference metric for the beam (at block 146) based on all reported device-specific RSRP values obtained by the first network node at block 146. The beam-specific interference metric may represent a level of inter-cell interference caused by the second node's beam in the neighboring cell served by the first network node. Then, at block 152, the first network node may transmit the beam-specific interference metric to the second network node, which may use the received interference metric to determine whether the beam under consideration is causing undesirable interference in the second network node's cell and, hence, should be removed from the available set of candidate beams for directional signal transmissions.

FIGS. 8-9 provide an overview of the interference management methodology according to particular embodiments of the present disclosure. A more detailed discussion of the entire process is now provided. In the discussion below, it is assumed that a distributed approach is used to enable a transmitting eNB—here, it is assumed to be the eNodeB 107—to determine which beams from a possible set of beams should be removed as candidate beams and not be included in the (final) restricted set of beams to be used for eventual data transmissions to wireless devices 87-91 attached thereto or served thereby. As mentioned before, a centralized approach using, for example, the central node 112, may be used instead of the distributed approach in certain embodiments. For ease of discussion, the entire interference management methodology as per teachings of the present disclosure may be divided into the following five (5) steps. These steps are for the sake of convenience of discussion only; they do not imply any particular order, hierarchy, or relative importance.

(1) Transmit a Set of CSI-RS and Instruct Other eNodeBs in the Cluster to Request RSRP Measurements from their Served UEs To decide which beam(s) to remove, the transmitting network node 107 may need information about the level of interference each of its beams causes to UEs in its neighbor cells. Hence, in one embodiment, the transmitting node 107 may transmit a set of reference signals in order to probe the level of inter-cell interference caused by its beams. For each beam in the possible set of candidate beams, a beamformed reference signal may be transmitted on a separate CSI-RS resource. The possible set of beams thus may be mapped to a set of CSI-RS resources: {CSI-RS resource 1, CSI-RS resource 2, . . . }. Thus, each candidate beam may have an associated beam-specific CSI-RS resource.

In one embodiment, the transmitting network node 107 may then instruct the other neighboring network nodes/eNodeBs 108-109 within its cooperation cluster to RRC configure each UE connected to those neighboring nodes to measure upon the set of beam-specific CSI-RS resources {CSI-RS resource 1, CSI-RS resource 2, . . . } and report back RSRP corresponding to each CSI-RS resource. As mentioned before, in certain embodiments, the DRS procedure may be used by the transmitting node 107 to accomplish this RRC configuration. Each of the neighboring network nodes or eNBs may then accordingly receive a set of RSRP reports from each UE that is connected to it.

(2) Calculate a Beam Interference Metric for Each Beam

Each neighboring network node 108-109 may then calculate a metric $Q_i$ for each probed beam (or CSI-RS resource) "i". For example, for each UE "u" and for each beam-specific CSI-RS resource "i", the neighboring network node/eNB may calculate a metric that is a function of the RSRP of the serving beam of the UE "u" and the RSRP of the CSI-RS resource "i", so that:

$$Q_{i,u} = f([RSRP_{i,u}]_{dB}, [RSRP_{serving,u}]_{dB}) \quad (1)$$

In one embodiment, the serving RSRP (or $RSRP_{serving,u}$ in equation (1) above) may be obtained using the earlier-mentioned explicit or implicit CSI feedbacks. Furthermore, the serving RSRP may also be fed back with the other RSRPs in the DRS procedure. In some embodiments, the function in equation (1) may be the difference between the RSRP of the CSI-RS resource "i" and that of the serving beam of UE "u":

$$Q_{i,u} = [RSRP_{i,u}]_{dB} - [RSRP_{serving,u}]_{dB} \quad (2)$$

In one embodiment, the metric "$Q_{i,u}$" in equation (2) may be just the RSRP of the beam directly, without subtracting the serving RSRP. In another embodiment, the function in equation (1) may be the following equation (3):

$$Q_{i,u} = [RSRP_{i,u}]_{dB} - [RSRP_{serving,u}]_{dB} + \text{constant} \quad (3)$$

The individual, UE-specific interference metric $Q_{i,u}$ in equation (2) may serve as an indicator of how much the beam corresponding to the CSI-RS resource "i" would interfere UE "u" if the beam corresponding to the CSI-RS resource "i" had been used for data transmission by the transmitting eNodeB 107.

If $Q_{i,u}$ in equation (2) is significantly less than zero, the serving beam may be much stronger than the interfering beam. In that case, it would not hurt the system performance if the transmitting eNodeB 107 would keep this beam "i" in the restricted set of candidate beams to be used for data transmission.

However, if $Q_{i,u} \approx 0$ in equation (2), the interfering beam may be approximately equally strong as the serving beam. In that case, the Signal to Interference and Noise Ratio (SINR) of the UE "u" could be drastically reduced if this beam were used by the transmitting network node 107.

On the other hand, if the respective neighboring node determines that $Q_{i,u}$ in equation (2) is larger than a threshold "β", the UE "u" may benefit from having the interfering beam (from the transmitting node 107) as its serving beam instead of its current serving beam. In that case, the neighboring node may initiate a handover to the transmitting network node 107. In certain embodiments, the threshold may be pre-determined. For example, the threshold "β" may be set to a fixed value, like 3 dB, to correspond to a typical handover hysteresis. In some other embodiments, the value of "β" may depend on which UE "u" and CSI-RS resource "i" is considered. In another embodiment, the threshold may not be fixed, but may depend on the existing channel condition reported by the UE "u" in the earlier-mentioned CSI feedback. For example, if the CSI feedback indicates that the UE's channel condition varies rapidly with time, a larger threshold may be used. In particular embodiments, the threshold may be determined by, stored in, or provided to the UE's serving node—that is, the neighboring network node 108 or 109—by, for example, the core network 114.

(3) Issue Handover Command

In particular embodiments, the $Q_{i,u}$ values for all users (UEs) which would not benefit from a handover may then be weighted together—by the respective neighboring network node—to form a single, beam-specific interference metric $Q_i$ for each corresponding CSI-RS resource. In some embodiments, the per-user metrics $Q_{i,u}$ may be weighted together by a simple linear average to form the single metric $Q_i$. In other embodiments, the single metric may be computed by calculating a weighted sum of the per-user metrics, where the sum may be weighted by the inverse of the SINR of each user (UE), so that the contribution of UEs having poor SINR is valued higher.

In certain embodiments, each neighboring network node may map the single metric $Q_i$ for each corresponding CSI-RS resource in two categories by comparing it to a threshold value "α": (i) If the beam-specific interference metric $Q_i$ is smaller than "α", the CSI-RS resource "i" may be categorized in a "low interference" category. (ii) If $Q_i$ is larger than or equal to "α", the corresponding CSI-RS resource "i" may be categorized in a "high interference" category. In one embodiment, the value of "α" may be 9 dB.

For each UE that would benefit from being handed over to the transmitting network node 107—that is, those UEs in the neighboring cells that have a respective $Q_{i,u}$ value larger than the threshold "β" for some "i", the UE's serving eNodeB, such as the eNodeB 108 or 109, may issue a handover command to hand over the UE to the transmitting eNodeB 107.

After performing the handover, the (now previously) serving eNodeB 108 or 109 may take the opportunity to consider if its own beam(s) that was previously serving the UE(s) that was handed over should be removed from its own set of possible candidate beams because that beam(s) may cause interference to the newly handed-over UE(s).

(4) Signal a Set of Beam Interference Metrics

Each neighboring network node (eNodeB) 108-109 may now signal a set of beam-specific interference metrics—one interference metric a per beam "i"—back to the transmitting network node 107, indicating an interference level of each CSI-RS resource "i" (transmitted by the node 107 in a corresponding beam "i"). In one embodiment, the $Q_i$ values may be signaled directly. In another embodiment, only those $Q_i$ values that fall into the earlier-mentioned "high interference" category may be signaled to the transmitting network node 107. In yet another embodiment, the $Q_i$ values may not be signaled directly, but may be signaled indirectly such as, for example, when only a single bit may be signaled for each CSI-RS resource "i", indicating if the corresponding beam "i" falls into the high or the low interference category. For example, a bit "0" may be signaled to indicate that the corresponding beam is in the low interference category, whereas a bit "1" may refer to a beam causing high interference.

(5) Utilize Signaled Metrics to Construct the Restricted Set of Beams

Upon receiving the signaled metrics from the neighboring nodes 108-109, the transmitting node 107 may then utilize the received information to decide which beams, if any, need to be removed from the possible set of candidate beams to construct the restricted set of candidate beams to be used eventually for data transmissions.

As mentioned before, the transmitting network node 107 may receive a set of $Q_i$ values from each of the other neighboring network nodes 108-109. In some embodiments, the transmitting node 107 may sum the $Q_i$ values from all neighboring nodes 108-109 to create an average $Q_i$ value, for each CSI-RS resource. These average $Q_i$ values may then be used to determine which of the corresponding beams from the possible set of candidate beams should be removed. In one embodiment, all beams with a corresponding average $Q_i$ value that exceeds a threshold "γ" may be excluded. The value of "γ" may be fixed, or may be periodically re-defined based on factors such as the total number of UEs affected by the interfering beam, the existing channel conditions, ease of handover of UEs currently being served by the eNodeB 107 with the beams to be removed, and the like.

In another embodiment, the decision to exclude a beam is not solely taken based on the acquired $Q_i$ values, but the relative usages of different beams are taken into account as well. For example, if a certain beam $i=i_0$ is chosen by many of the UEs served by the transmitting eNodeB 107, it might not be beneficial to exclude the beam "$i_0$" even if its average $Q_i$ value is large.

In a further embodiment, a set of beams with large average $Q_i$ values may be chosen by the transmitting node 107 as "exclusion candidates." For each possible subset of these beams, the transmitting node 107 may calculate a beam-specific "RSRP loss" metric for each UE that is currently being served by a beam in the subset. In one embodiment, the "RSRP loss" metric may be defined as the difference between the RSRP of the currently used beam (the one within the subset) and the RSRP of the best beam that the UE would be able to choose if the entire subset is excluded from the possible set of candidate beams. The decision of which subset, if any, should be excluded may then be made by comparing the "RSRP loss" metric with the average $Q_i$ values of the beams within the subset. For example, a beam "i" may be excluded if the RSRP loss metric is less than $C*Q_i$ (RSRP loss metric<$C*Q_i$), where the scaling factor "C" could, for example, take into account that there are more users in all the neighboring cells than in the target cell and, thus, even a small reduction of interference to the neighbors could add up to a larger increase in system performance. In any event, it is observed that removing a beam from a subset may cause a loss in the SINR for the users in the cell under consideration (the target cell), but may also cause a gain in the SINR for the users in other cells (the neighboring cells).

FIG. 10 shows an exemplary flowchart 155 depicting how the interference management scheme as per particular embodiments of the present disclosure may be performed in a centralized manner. As mentioned earlier, the embodiments in FIGS. 8-9 related to interference management in a distributed fashion. On the other hand, in the embodiment of FIG. 10, a central node, such as the central node 112 in FIG. 7, may perform various actions to accomplish interference management in a centralized manner. Many aspects performed by the transmitting network node 107 in the embodiment of FIG. 8 may be performed by the central node 112 in the embodiment of FIG. 10. However, for the sake of brevity and in view of the extensive discussion of the distributed approach with reference to embodiments of FIGS. 8-9, only a brief discussion of central node-based actions is provided here.

As noted at block 157, the central node 112 may obtain a level of inter-cell interference caused in a neighboring cell, such as any of the neighboring cell (not shown) associated with the neighboring network node 108 or 109, by a transmitting node's 107 transmissions in each of a plurality of candidate beams. As before, the transmitting network node 107 may utilize beamforming for directional signal transmission to wireless devices 87-91 operating within a served cell (associated with the transmitting node 107) and it also may dynamically select a beam from the plurality of candidate beams for transmitting data to one or more of the wireless devices 87-91. The central node 112 may be in operative communication with the transmitting node 107 such as, for example, through the earlier-mentioned "S1" interface between the core network 114 and each of the eNodeBs 107-109.

At block 159, the central node 112 may identify any beams that caused the level of inter-cell interference in the neighboring cell to exceed a high interference threshold. Based on this identification, the central node 112 may perform one of the following actions indicated at block 161: (i) remove any identified beams from the plurality of candidate beams, or (ii) instruct the transmitting node 107 to remove the identified beams. The removal of identified beams may create a set of remaining candidate beams.

Finally, at block 163, the central node 112 may instruct the transmitting network node 107 to transmit data to the wireless devices 87-91 operating within the served cell utilizing only the beams selected from the set of remaining candidate beams.

In one embodiment, the central node 112 may instruct a neighboring network node, such as the eNodeB 108 or 109, to request signal quality measurements from the wireless devices operating in the corresponding neighboring cell, and to then calculate and report the beam-specific interference metrics discussed earlier. In one embodiment, the central node 112 may use the set of beam interference metrics received from a neighboring network node to determine which one or more beams from the transmitting network node 107 cause an undesirable level of inter-cell interference.

In another embodiment, the central node 112 may instruct the transmitting network node 107 to transmit a beam-specific reference signal—such as, for example, a beam-specific CSI-RS resource using a DRS signal mechanism—in each of its candidate beams. Similarly, in one embodiment, the central node 112 may use the DRS procedure to also instruct a neighboring network node, such as, for example, the eNodeB 108, to RRC configure the UEs (being served by the neighboring node) to measure and report UE-specific RSRP value of each beam-specific reference signal transmitted by the transmitting eNodeB 107, and to also generate the beam-specific interference metric for each beam (from the transmitting node 107) based on the reported UE-specific RSRP values.

FIG. 11 is a block diagram of an exemplary central node, such as the central node 112 in FIG. 7, according to one embodiment of the present disclosure. As mentioned before, the central node 112 may be part of or reside in the core network 114 portion of the carrier's network 105. In other embodiments, the central node 112 may be part of a different portion of the carrier network 105, or may be a separate node in the carrier network 105. As shown in FIG. 11, in one embodiment, the central node 112 may include a processor 165, a memory 167, and a base station interface unit 168. The processor 165 may include a Beam Selection Processing Module 170, which may include program code. For example, upon execution of the program code of the module 170 by the processor 165, the processor may configure the central node 112 to perform various tasks discussed hereinbefore with reference to FIG. 10 to determine and remove interfering beams of the transmitting network node, such as the eNodeB 107. These tasks also may include additional central node-based actions discussed before and, even if not discussed before, could be performed by the central node 112 when teachings of the present disclosure are implemented in a centralized manner.

The memory 167 may store, for example, the beam interference metrics received from neighboring network nodes 108-109, and any information about the beams to be recommended to the transmitting node 107 for removal from its possible set of candidate beams to generate the restricted set of beams. Such information may be received, for example, from the processing module 170. The memory 167 also may store other content received from a network node or to be sent to the network node. The interface unit 168 may communicate with the processor 165 to perform transmission/reception of data, control, or other information—such as, for example, the interfering beam(s)-related information stored in the memory 167—to/from the network node with which the central node 112 may be in communication. For example, in one embodiment, the processor 165 may receive a beam interference metric from a neighboring network node 108-109 via the base station interface unit 168, and may later retrieve from the memory 167 beam-identifying information for an interfering beam and provide it to the interface unit 168 to be sent to the transmitting network node 107. In one embodiment, the interface unit 168 may support the earlier-mentioned "S1" interface based communication between a base station 107-109 and the core network 114 in the carrier network 105.

Alternative embodiments of the central node 112 may include additional components responsible for providing additional functionality, including any of the functionality identified herein and/or any functionality necessary to support the centralized approach-based solution as per the teachings of the present disclosure.

In one embodiment, the central node 112 may be configured—in hardware, via software, or both—to implement various central node-specific aspects as per teachings of the present disclosure. The software or program code may be part of the module 170 and may be stored in the memory 167 and executable by the processor 165. For example, when existing hardware architecture of the central node 112 cannot be modified, the functionality desired of the central node 112 may be obtained through suitable programming of the processor 165 using the module 170, with or without additional storage provided by the memory 167. The execution of the program code, by the processor 165, may cause the central node 112 to perform as needed to support the beam reduction-based interference management solution as per the teachings of the present disclosure. Thus, although the central node 112 may be referred to as "performing," "accomplishing," or "carrying out" (or similar such other terms) a function or a process or a method step, such performance may be technically accomplished in hardware and/or software as desired. The network operator or a third party, such as, for example, a manufacturer or supplier of the central node 112, may suitably configure the node 112, for example, through hardware and/or software-based configuration of the processor 165, to operate and reciprocate with the network nodes, such as the eNBs 107-109 in FIG. 7, as per the particular requirements of the present disclosure discussed above.

Figure 12:
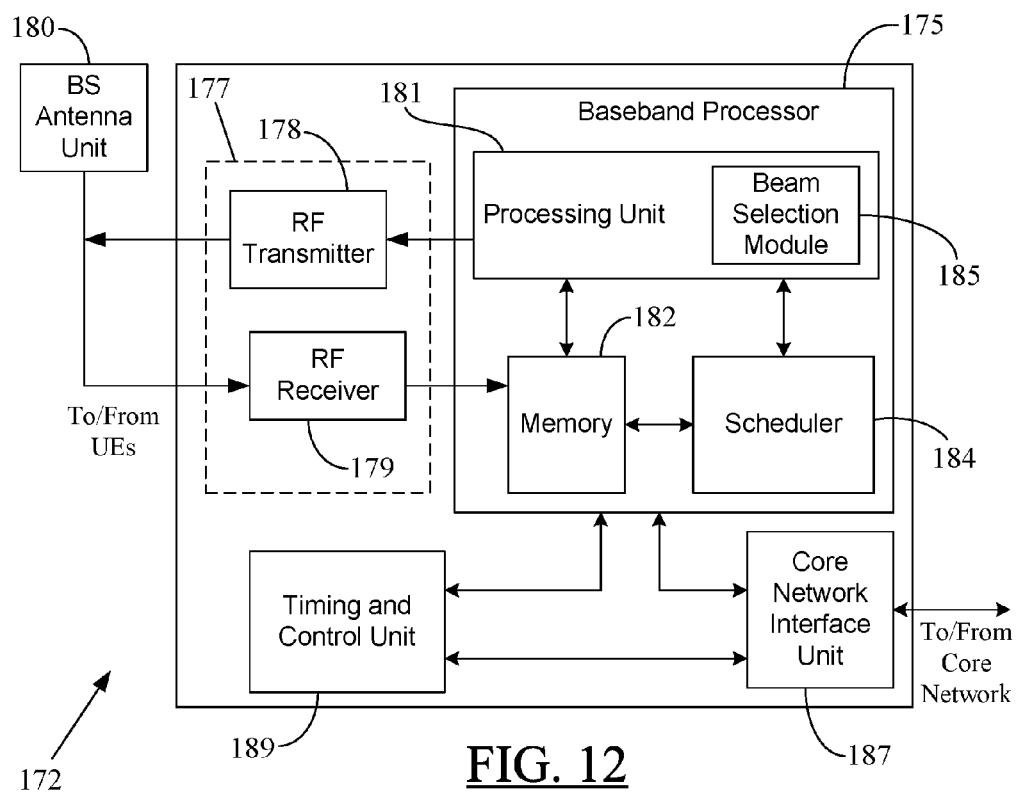
FIG. 12 depicts an exemplary block diagram of a base station that may function as a network node according to one embodiment of the present disclosure.

FIG. 12 depicts an exemplary block diagram of a base station 172 that may function as a network node according to one embodiment of the present disclosure. In other words, the base station 172 may represent any of the network nodes (or eNodeBs) 107-109 in the embodiment of FIG. 7. Thus, the base station 172 may be configured to perform various functionalities discussed earlier with reference to FIGS. 8 and 9. For example, in the distributed approach to interference management according to the teachings of the present disclosure, the base station 172 may be configured to perform as a transmitting network node as well as a neighboring network node depending on whether it is the instructing/controlling node or responding node, respectively. Thus, as a transmitting network node, the functionalities discussed earlier with reference to the eNodeB 107 may be performed by the base station 172. Similarly, as a responding node, the base station 172 also may perform the earlier-discussed functionalities of a neighboring network node, such as the network node 108 or 109. In particular embodiments, the base station 172 may or may not use a secondary node such as, for example, a pico base station or an access point, to perform some or all of such tasks.

The base station 172 may include a baseband processor 175 to provide radio interface with the wireless devices, such as the UEs 87-91, via base station's Radio Frequency (RF) transceiver unit 177, which may include RF transmitter 178 and RF receiver 179 units coupled to an antenna unit 180 as shown. The antenna unit 180 may include one or more antennas (not shown) forming an antenna array, and, in certain embodiments, the base station 172 may support Carrier Aggregation. Thus, in particular embodiments, the antenna unit 180 may represent any of the antenna arrays 117-119 shown in FIG. 7.

In one embodiment, the processor 175 may receive transmissions from the wireless devices via the combination of the antenna unit 180 and the receiver 179. Such transmissions may include, for example, uplink and/or downlink channel condition related information, RSRP measurements for CSI-RS resources as part of the DRS mechanism-based interference management discussed earlier, geographical location information, requests for multimedia content, user data, and the like. The base station's transmissions to the wireless device may be carried out via the combination of the antenna unit 180 and the transmitter 178. Such BS-originated transmissions include, for example, timing and synchronization signals, RRC configuration messages for beam-specific RSRP measurements, streaming of user-requested multimedia content, a query for a mobile device's geographical location information, scheduling-related messages, and the like.

The processor 175 may be configured (in hardware and/or software) to perform various actions mentioned above as well as discussed with reference to FIGS. 7-9 as being performed by a network node 107-109. In that regard, the processor 175 may include a processing unit 181 coupled to a memory 182 and a scheduler 184 to enable the processor 175 to perform such actions discussed in detail hereinbefore. In one embodiment, the memory 182 may be a separate unit—that is, not an internal part of the processor 175 as in FIG. 12—but coupled to the processor 175 to provide requisite storage. In another embodiment, the memory 182 may function as a storage of content such as, for example, a channel condition measurement report received from a UE, an RSRP value reported for a beam-specific CSI-RS resource, beam-specific interference metrics received from the neighboring network nodes, and the like. The memory 182 may also contain program code that, upon execution by the processing unit 181 and/or the scheduler 184, may configure the base station 172 to perform some or all of the interference management related tasks discussed with reference to FIGS. 7-9.

The scheduler 184 may provide the Uplink (UL) and Downlink (DL) scheduling decisions for the wireless devices attached to the base station 172 based on a number of factors such as, for example, Quality-of-Service (QoS) parameters, device buffer status, UL and DL channel condition related information received from the devices, device capabilities, and the like. In one embodiment, the network node 172 may include separate UL and DL schedulers (not shown in FIG. 12) as part of its baseband processor 175. The scheduler 184 may have the same data structure as a typical scheduler in an eNB in an LTE system.

In the embodiment of FIG. 12, the processing unit 181 is shown to include a Beam Selection Module 185 that may contain a portion of the program code stored in the memory 182, or may retrieve the relevant program code from the memory 182 during run time, or may contain all of the program code needed to enable the processing unit 181 to perform beam removal-based interference management as per teachings of the present disclosure. In one embodiment, the program code in the module 185, when executed in conjunction with the program code in the memory 182 or independently of the program content in the memory 182, may configure the eNB 172 to select the initial set of candidate beams as well as to remove undesirable candidate beams according to particular embodiments of the present disclosure. For example, through the module 185, the processing unit 181 may execute appropriate program code to obtain level of inter-cell interference caused by the initial set of candidate beams, process various interference metrics received from neighboring network nodes, remove the beams reported to be "undesirable" by neighboring network nodes, use the restricted set of beams for subsequent data transmissions, and the like, as per teachings of the present disclosure. More generally, various eNB-based actions discussed before with reference to the embodiments in FIGS. 7-9 may be performed by the processing unit 181, which may operate in conjunction with the module 185 and the memory 182, as needed.

The processor 175 may also provide beamforming, generation of interference metrics, implementation of the DRS mechanism, and additional baseband signal processing as required. Such processing may include, for example, mobile/wireless device registration, channel information transmission, radio-resource management, and the like. The processing unit 181 may be in communication with the memory 182 to process and store relevant information for the corresponding cell site such as, for example, the identities of the UEs or wireless devices operating within the source cell, channel-condition reports received from wireless devices, user data received from or to be sent to the UEs operating within the source cell, interference metrics received from neighboring network nodes, and so on. The processing unit 181 may include, by way of example, a general-purpose processor, a special-purpose processor, a conventional processor, a digital signal processor (DSP), a plurality of microprocessors, one or more microprocessors in association with a DSP core, a controller, a microcontroller, Application-Specific Integrated Circuits (ASICs), Field-Programmable Gate Arrays (FPGAs) circuits, any other type of integrated circuit (IC), and/or a state machine. The processor 175 may employ distributed processing in certain embodiments.

As noted before, in particular embodiments, some or all of the functionalities described above and earlier with reference to FIGS. 7-9 as being provided by a network node, such as a base station, a wireless access node/point, and/or any other type of mobile communications node used as a base station, may be provided by the processing unit 181 executing instructions stored on a computer-readable data-storage medium, such as the memory 182 and/or the beam selection module 185 shown in FIG. 12.

The network node 172 in the embodiment of FIG. 12 may further include a core network interface unit 187 and a timing and control unit 189. The control unit 189 may monitor operations of the processor 175 and the network interface unit 187, and may provide appropriate timing and control signals to these units. The interface unit 187 may provide a bi-directional interface for the base station 172 to communicate with its core network, such as the CN 114 in FIG. 7, or other network-based control entity to facilitate administrative and call/data-management functions for mobile subscribers operating in the corresponding cell site of the carrier network, such as the operator network 105 in FIG. 7.

Alternative embodiments of the base station 172 may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features and elements. Some or all aspects of the beam removal-based interference management methodology discussed herein may be implemented in a computer program, software, or firmware incorporated in a computer-readable storage medium, such as, for example, the module 185 and/or the memory 182 in FIG. 12, for execution by a general-purpose computer or a processor, such as, for example, the processing unit 181 in FIG. 12. Examples of computer-readable storage media include a Read-Only Memory (ROM), a Random-Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs). In certain embodiments, the memory 182 may employ distributed data storage with/without redundancy.

The foregoing describes a system and method of designing an angular beamforming mask such that a "gap" in a base station's angular power profile may be created to reduce the amount of inter-cell interference generated at certain critical directions. A slow-scale coordination feature among a plurality of network nodes (or eNodeBs) cooperating in a cluster may allow the eNodeBs to jointly derive a suitable "gap" in the angular power profile of each eNodeB. A transmitting network node or eNB may rely on DRS based RSRP measurements of its beams from a neighboring network node, which may signal an interference metric for each beam indicating a relative beam interference level. The transmitting network node may utilize the signaled metrics to determine which beams are causing undesirable interference in neighboring cells and, hence, should be removed from its set of candidate beams to create a "gap" in its angular power profile. The remaining candidate beams then may be used by the transmitting network node for subsequent directional data transmissions to wireless devices attached to it. Instead of this distributed approach, a central node-based interference evaluation and consequent beam removal may be implemented.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a transmitting network node for reducing inter-cell interference in a cellular telecommunication network in which the transmitting network node utilizes beamforming for directional signal transmission to wireless devices operating within a served cell, wherein the transmitting network node dynamically selects a beam from a plurality of candidate beams for transmitting data to one or more of the wireless devices, the method comprising:
   obtaining a level of inter-cell interference caused in a neighboring cell by transmissions in each of the plurality of candidate beams;
   removing from the plurality of candidate beams, any beams that caused the level of inter-cell interference in the neighboring cell to exceed a high interference threshold, thereby creating a set of remaining candidate beams; and
   transmitting data to the wireless devices operating within the served cell utilizing only beams selected from the set of remaining candidate beams, wherein obtaining a level of inter-cell interference includes:
   transmitting a beam-specific reference signal in each of the plurality of candidate beams utilizing a different reference signal resource for each beam; and
   obtaining a plurality of beam-specific interference metrics corresponding to interference levels in the neighboring cell caused by each of the plurality of candidate beams,
   wherein a central control node instructs a neighboring network node serving the neighboring cell to request signal quality measurements from wireless devices operating in the neighboring cell, and to calculate and report the beam-specific interference metrics.

2. The method according to claim 1, wherein obtaining a level of inter-cell interference includes:
   transmitting a beam-specific reference signal in each of the plurality of candidate beams utilizing a different reference signal resource for each beam;
   instructing a neighboring network node serving the neighboring cell to request from wireless devices operating in the neighboring cell, signal quality measurements of a serving signal and the beam-specific reference signals; and
   receiving from the neighboring network node, a plurality of beam-specific interference metrics corresponding to the plurality of candidate beams.

3. The method of claim 2, wherein transmitting the beam-specific reference signal includes:
   using a Discovery Reference Signal (DRS) mechanism to transmit the beam-specific reference signal.

4. The method of claim 2, wherein the reference signal resource is a Channel State Information-Reference Signal (CSI-RS) resource.

5. The method of claim 4, wherein instructing the neighboring network node includes:
   instructing the neighboring network node to Radio Resource Control (RRC) configure the wireless devices operating in the neighboring cell to measure and report a respective Reference Signal Received Power (RSRP) value of each beam-specific CSI-RS resource.

6. The method according to claim 4, further comprising performing the method with each of a plurality of neighboring network nodes.

7. The method of claim 6, wherein removing the beams includes:
   for a beam-specific CSI-RS resource, generating a resource-specific average value of all beam-specific interference metrics received from the plurality of neighboring network nodes for a candidate beam mapped to the beam-specific CSI-RS resource;
   for the beam-specific CSI-RS resource, comparing the resource-specific average value against the high interference threshold; and
   removing the candidate beam mapped to the beam-specific CSI-RS resource from the plurality of candidate beams if the resource-specific average value exceeds the high interference threshold.

8. The method of claim 6, wherein removing the beams includes one of the following:
   for each candidate beam in the plurality of candidate beams, generating a beam-specific average value of all corresponding beam-specific interference metrics received from the plurality of neighboring network nodes and removing the candidate beam from the plurality of candidate beams if the beam-specific average value exceeds the high interference threshold; and
   for each candidate beam in the plurality of candidate beams, removing the candidate beam from the plurality of candidate beams based on the beam-specific average value as well as relative usage of the candidate beam by wireless devices served by the transmitting network node.

9. The method of claim 6, wherein removing the beams includes:
   selecting a group of beams from the plurality of candidate beams, wherein each beam in the group is selected based on all corresponding beam-specific interference metrics received from the plurality of neighboring network nodes;
   creating a subset of beams from the group of beams;
   for each beam in the subset, calculating a beam-specific Reference Signal Received Power (RSRP) loss metric for each wireless device that is currently served by the beam in the subset, wherein the beam-specific RSRP loss metric for a wireless device represents a difference between a first RSRP of the beam in the subset that is currently serving the wireless device and a second RSRP of a best-available beam from the plurality of candidate beams that the wireless device is able to choose if the subset of beams is removed from the plurality of candidate beams; and removing each beam in the subset from the plurality of candidate beams based on a comparison of each beam-specific RSRP loss metric with an average of all beam-specific interference metrics received from the plurality of neighboring network nodes.

10. The method of claim 2, wherein a beam-specific interference metric in the plurality of beam-specific interference metrics is a function of the following:

a first Reference Signal Received Power (RSRP) value of the serving signal; and a second RSRP value of a beam-specific Channel State Information-Reference Signal (CSI-RS) resource measured by a wireless device operating in the neighboring cell.

11. The method of claim 10, wherein the function is a difference between the first and the second RSRP values.

12. The method of claim 2, wherein each of the transmitting network node and the neighboring network node is one of the following:

a Radio Base Station (RBS);
an evolved Node B (eNodeB); and
a node used as a base station.

13. The method of claim 1, wherein the transmitting node utilizes elevation beamforming, and wherein each candidate beam is a candidate elevation beam.

14. A method of reporting of inter-cell interference information by a first network node to a second network node associated with the first network node, wherein the second network node utilizes beamforming for directional signal transmission to wireless devices operating within a served cell, and wherein the method comprises performing the following by the first network node:

receiving an instruction from the second network node;

in response to the instruction, obtaining, from one or more wireless devices served by the first network node, a device-specific Reference Signal Received Power (RSRP) value of a beam-specific reference signal transmitted by the second network node in a beam;

generating a beam-specific interference metric for the beam based on all reported device-specific RSRP values, wherein the beam-specific interference metric represents a level of inter-cell interference caused by the beam in a neighboring cell served by the first network node; and transmitting the beam-specific interference metric to the second network node.

15. The method of claim 14, wherein receiving the instruction includes:

receiving the instruction as part of a Discovery Reference Signal (DRS) procedure.

16. The method of claim 14, wherein obtaining the device-specific RSRP value includes:

using Radio Resource Control (RRC) protocol to obtain the device-specific RSRP value of a beam-specific Channel State Information-Reference Signal (CSI-RS) resource transmitted by the second network node for the beam.

17. The method of claim 16, wherein generating the beam-specific interference metric includes:

for each wireless device served by the first network node, generating a device-specific interference metric as a function of the following:

the received device-specific RSRP value of the beam-specific CSI-RS resource, and an RSRP value of a serving beam used by the first network node for the wireless device; and combining device-specific interference metrics of two or more wireless devices served by the first network node to generate the beam-specific interference metric.

18. The method of claim 17, wherein the function is a difference between the received device-specific RSRP value and the RSRP value of the serving beam.

19. The method of claim 17, wherein combining the device-specific interference metrics includes:

obtaining a weighted average of the device-specific interference metrics of the two or more wireless devices to generate the beam-specific interference metric.

20. The method of claim 17, wherein the method comprises further performing the following by the first network node:

for a target wireless device served by the first network node, determining that the device-specific interference metric of the target wireless device is above a pre-defined threshold; and issuing a handover command to handover the target wireless device to the second network node.

21. The method of claim 20, wherein the first network node employs beamforming and utilizes the serving beam for directional signal transmission to the target wireless device, and wherein the method comprises further performing the following by the first network node:

removing the serving beam from a set of beams used by the first network node for data transmissions.

22. The method of claim 14, wherein transmitting the beam-specific interference metric includes one of the following:

directly signaling entire value of the beam-specific interference metric to the second network node;

signaling the beam-specific interference metric to the second network node only if the beam-specific interference metric is above a pre-defined threshold; and using a single bit to indirectly signal the value of the beam-specific interference metric to the second network node.

23. The method of claim 14, wherein each of the first and the second network nodes utilizes elevation beamforming, and wherein the beam transmitted by the second network node is an elevation beam.

* * * * *